United States Patent [19]

Barry

[11] 4,130,208
[45] Dec. 19, 1978

[54] SIDE RAILS CONTAINER TRANSFER SYSTEM

[76] Inventor: Leonard D. Barry, 19300 Pennington Dr., Detroit, Mich. 48221

[21] Appl. No.: 741,680

[22] Filed: Nov. 15, 1976

Related U.S. Application Data

[63] Continuation of Ser. No. 528,948, Dec. 2, 1974, abandoned.

[51] Int. Cl.$^2$ .................... B61D 47/00; B65G 67/02
[52] U.S. Cl. ........................................ 214/43; 104/18; 104/20
[58] Field of Search ................. 214/38 CB, 42 R, 43, 214/59 R; 104/18, 20

[56] References Cited

U.S. PATENT DOCUMENTS 3,483,829  12/1969  Barry ............................... 214/43 X Primary Examiner—Robert G. Sheridan

[57] ABSTRACT

A container or a carrier for one or more containers is supported on a transfer cam track along side a railway or roadway for transfer of the containers to a rail or road vehicle which is side coupled to the container or carrier to move it for transfer of the container or containers to the transport vehicle. The transfer track on which the container or carrier travels has horizontal and vertical displacement curves to vertically align the container with a container berth on the transport vehicle and set it down on supports thereon. The transfer track continues at the lower level and curves back away from the transport vehicle to remove the carrier away from the container. The cam track can be a single rail or multiple rails spaced horizontally or vertically with the container or carrier designed accordingly. The carrier can have forks, loadspreader, or side hooks to lift containers. The containers can have wheels to run on the station track to eliminate the carrier. The container wheels are retractable for selective transfer. Retractable hooking eyes or hooks can be on the carrier or container for selective transfer of multiple containers per carrier. In a preferred arrangement a carrier with fixed forks extending from a side thereof receives a container from a transport vehicle which supports the container with space for the forks to reach under the container from either side. Side latching couplings on the transport vehicle engage the forks on the carrier to move it along the low portion of the cam track to carry the forks under the container before the cam track lifts the container off and carries it on the forks out away from the transport vehicle moving the carrier. Another variation of the carrier and transport vehicle can support two containers at different levels so one container can be set in and one withdrawn along the same transfer run. The system can be applied to subways where the carrier can run between stations for transfer of containers to and from trains at speed and transfer containers to elevators to take passengers to street level. Subway cars are convertible to receive containers along opposite sides for runs in opposite directions.

17 Claims, 134 Drawing Figures

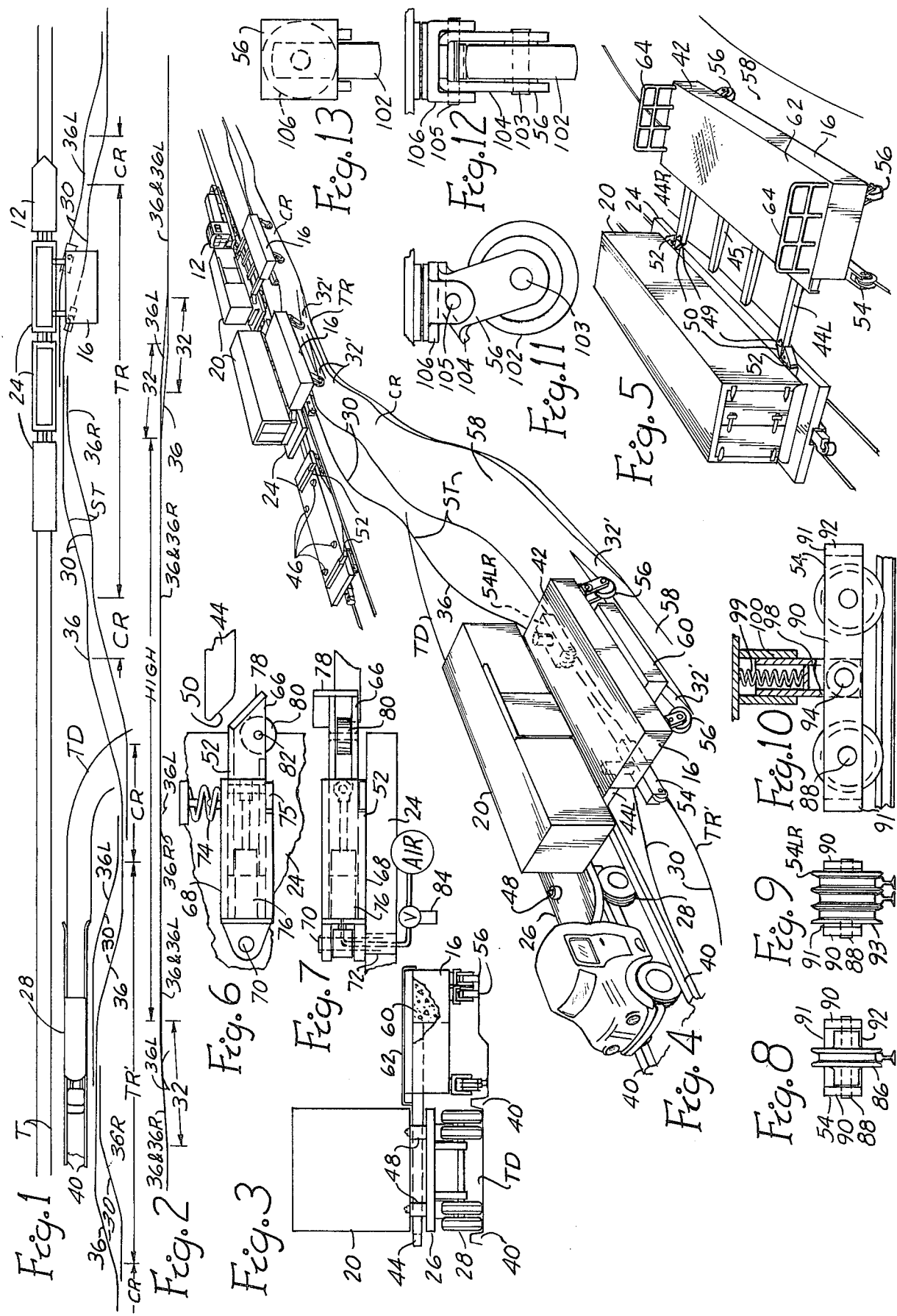

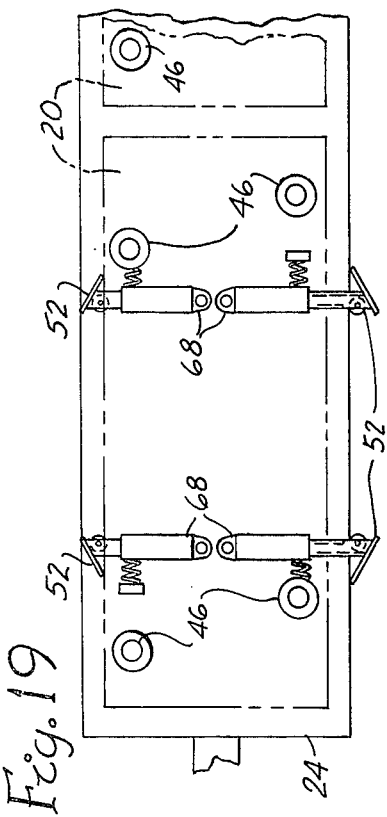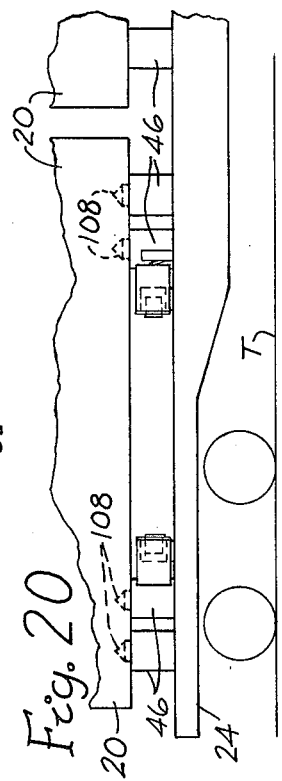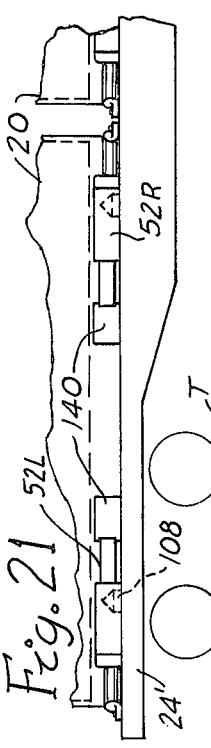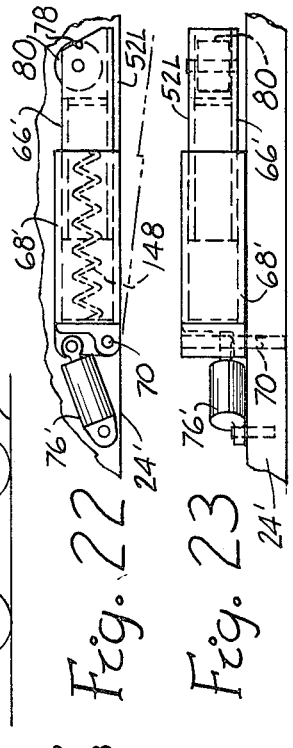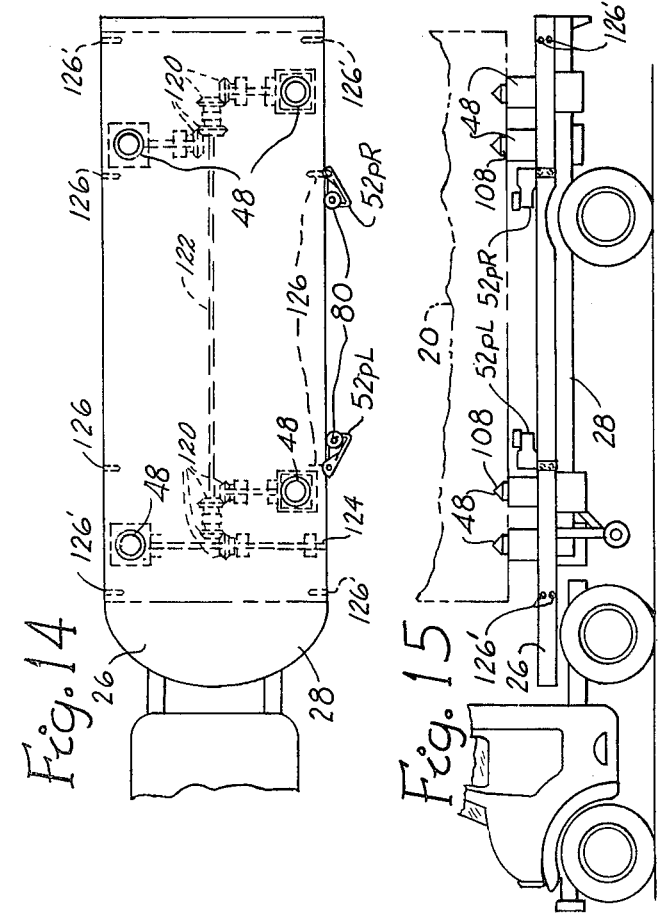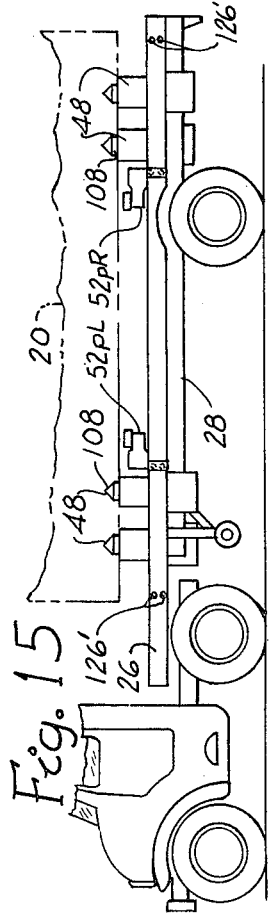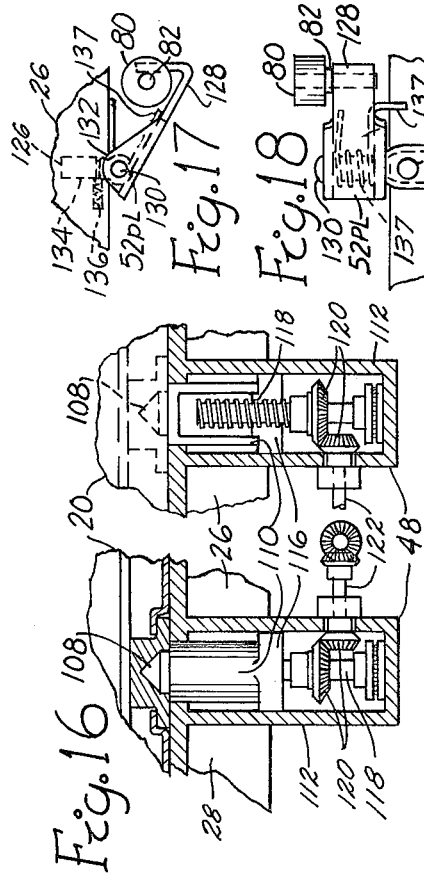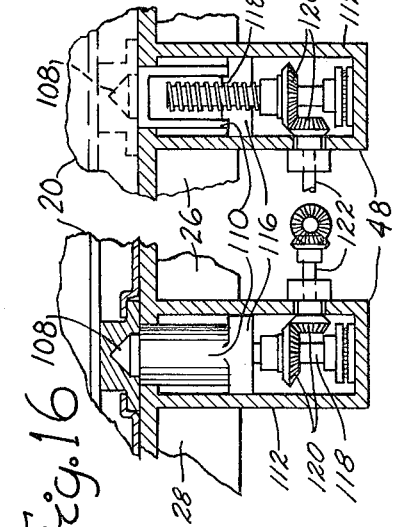

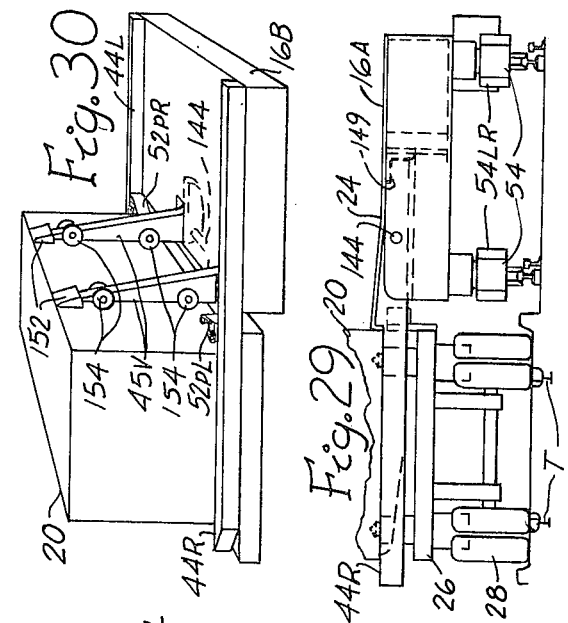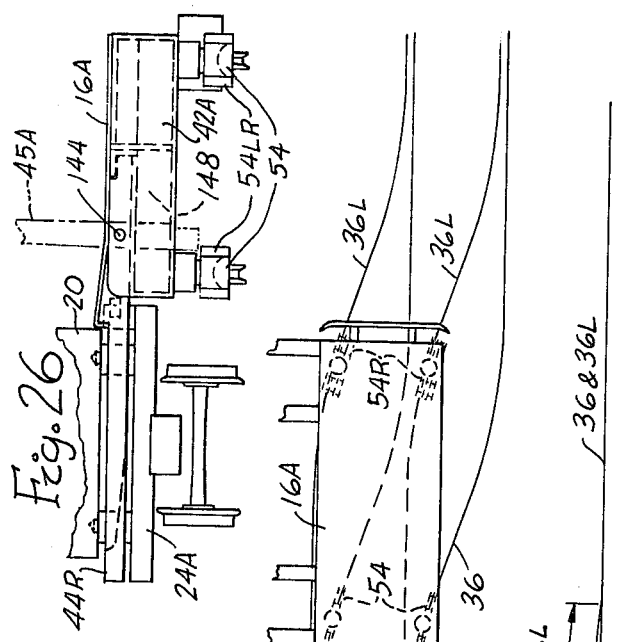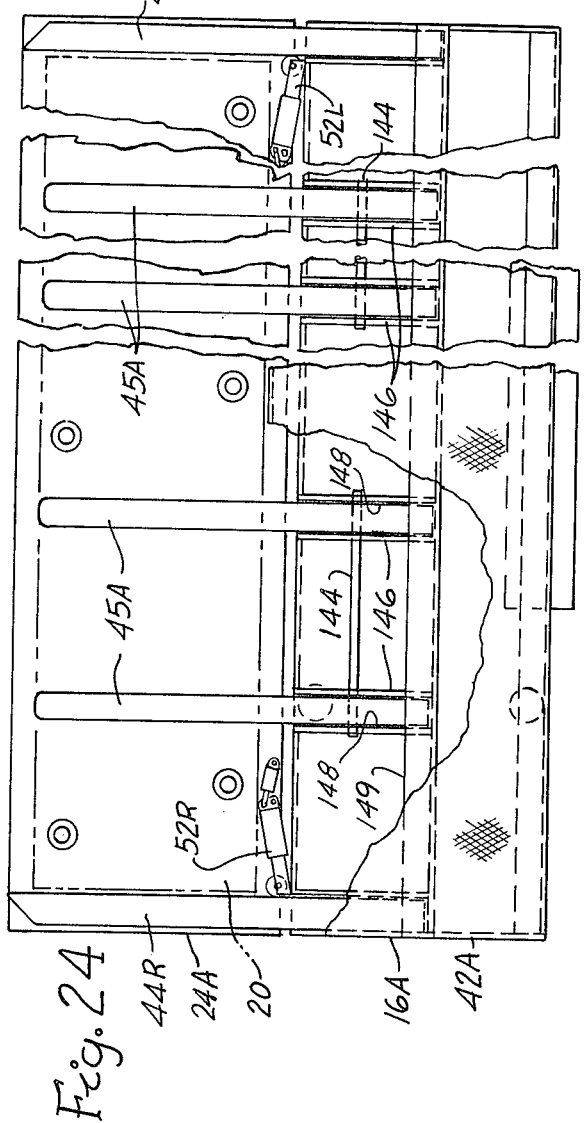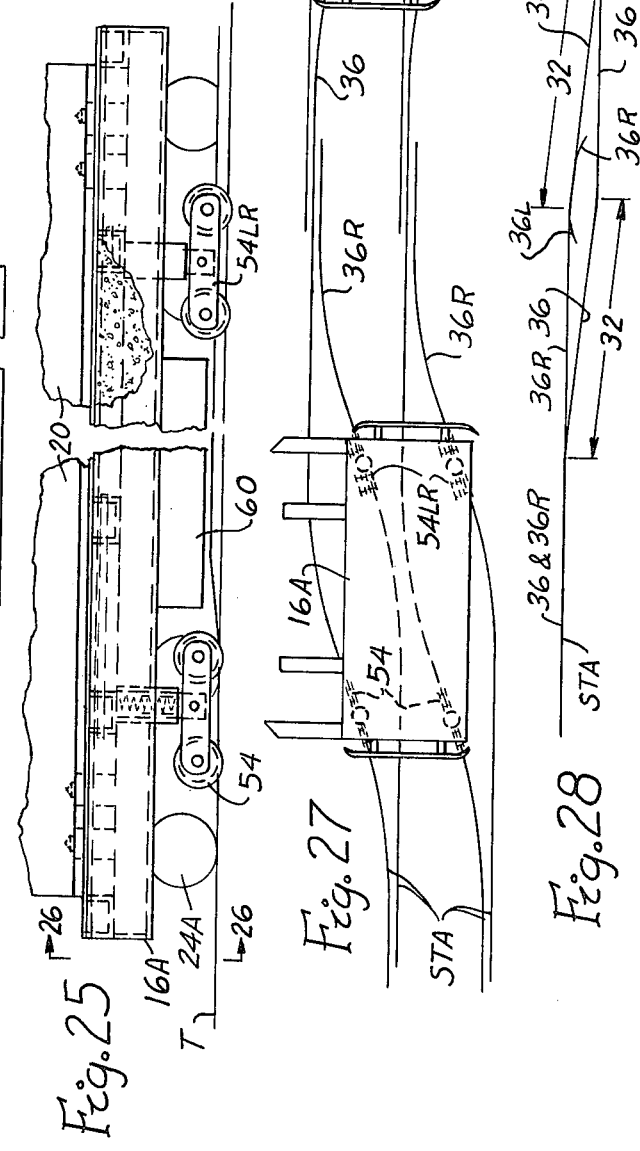

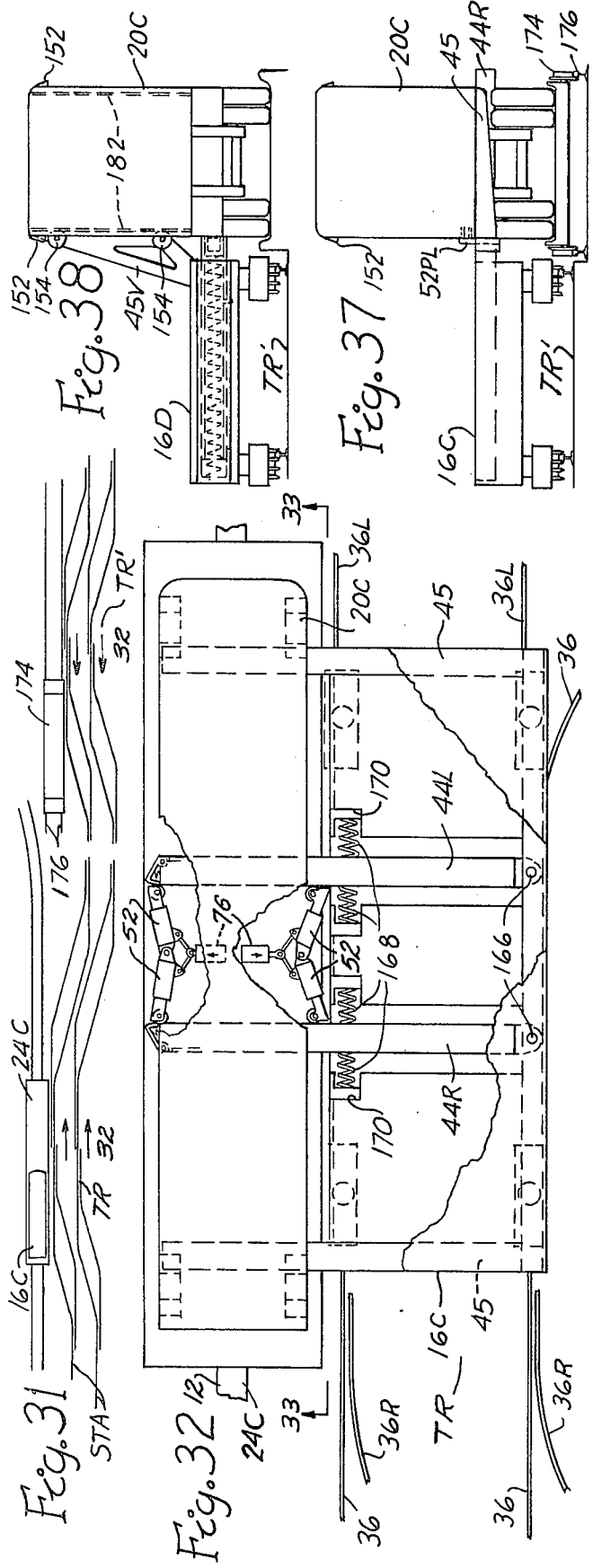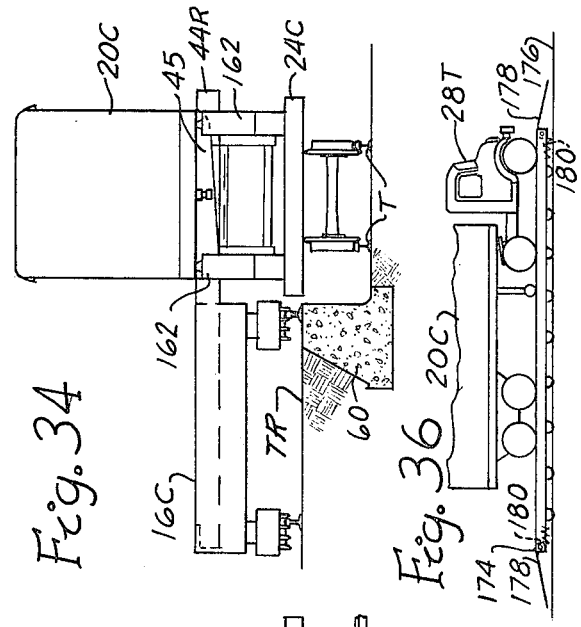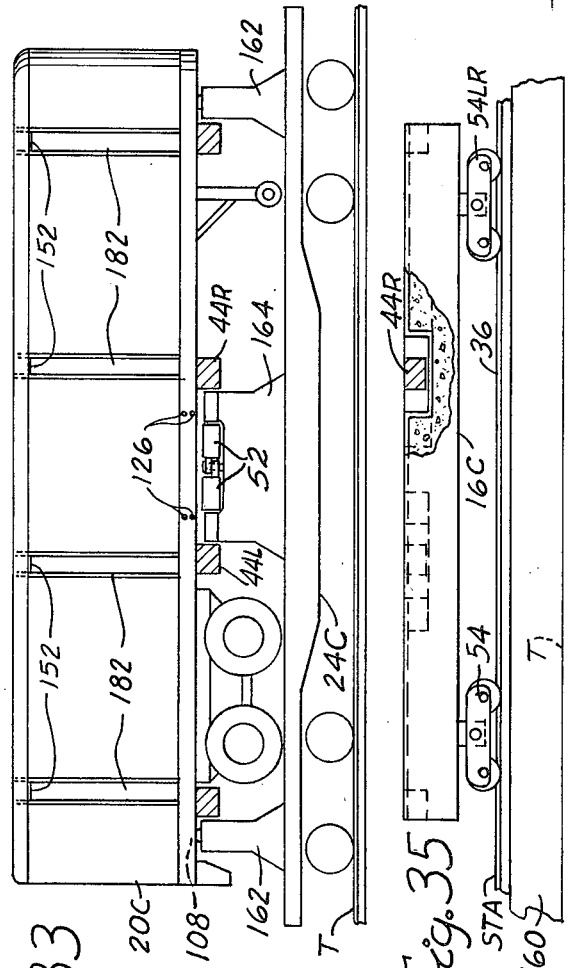

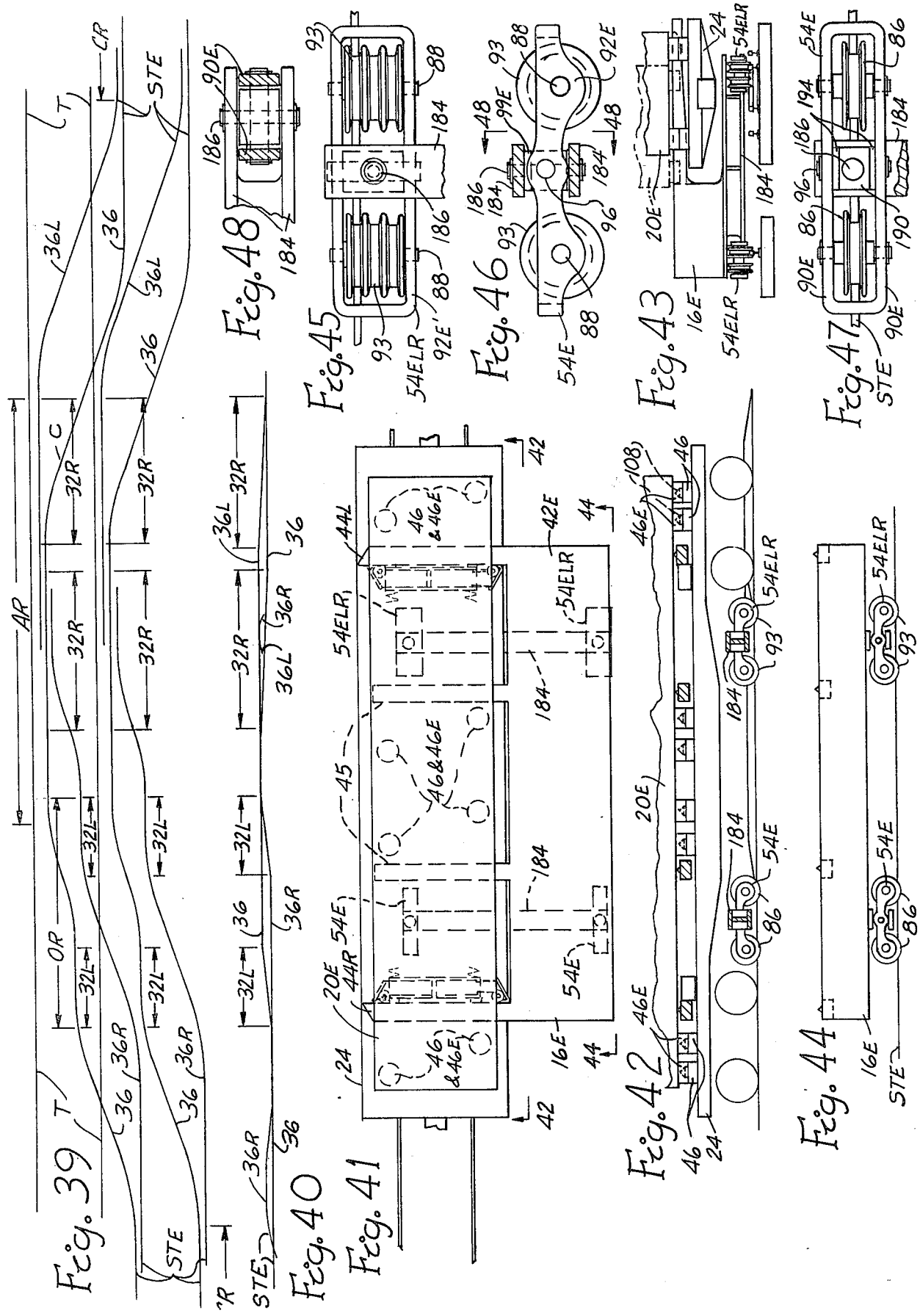

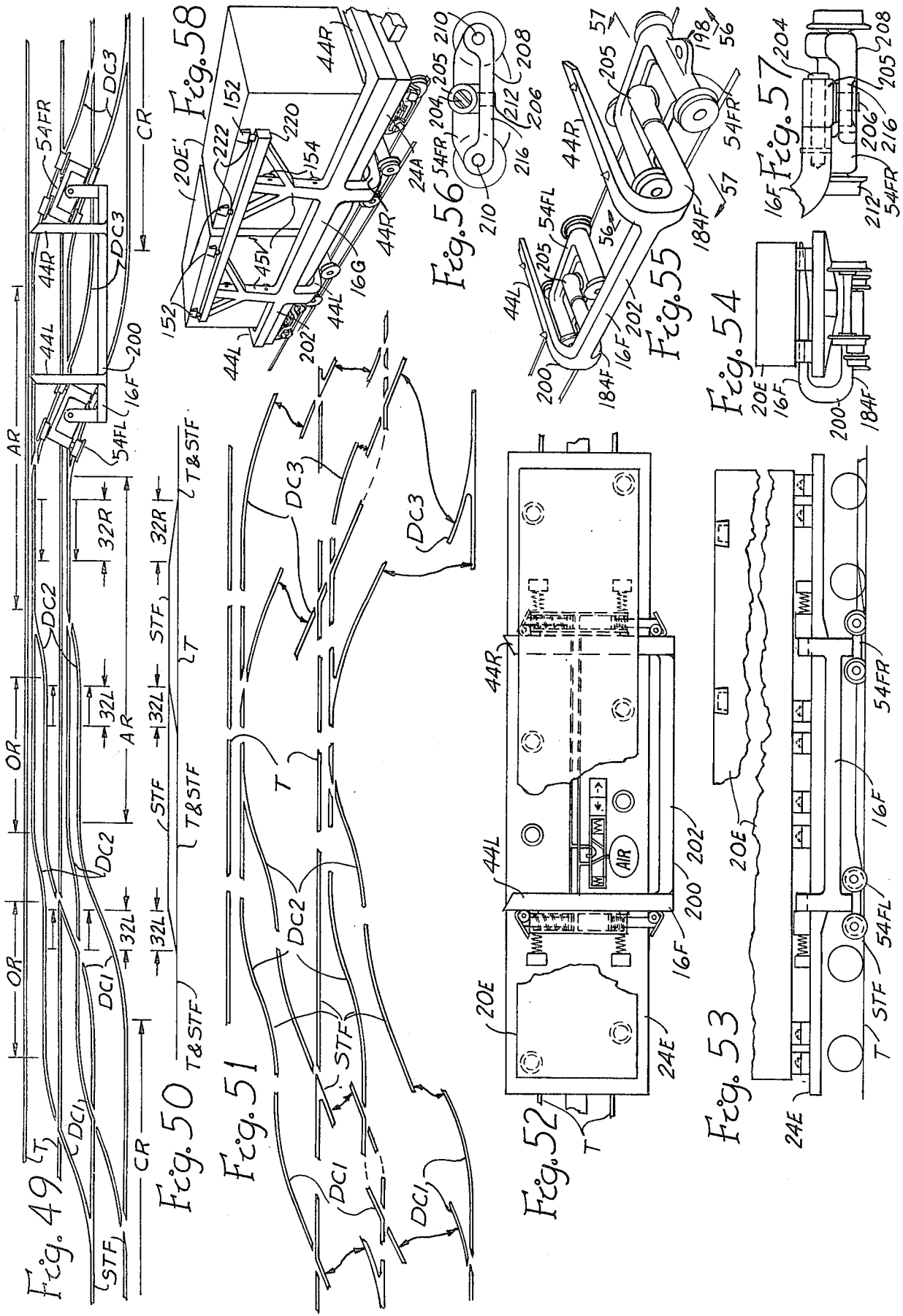

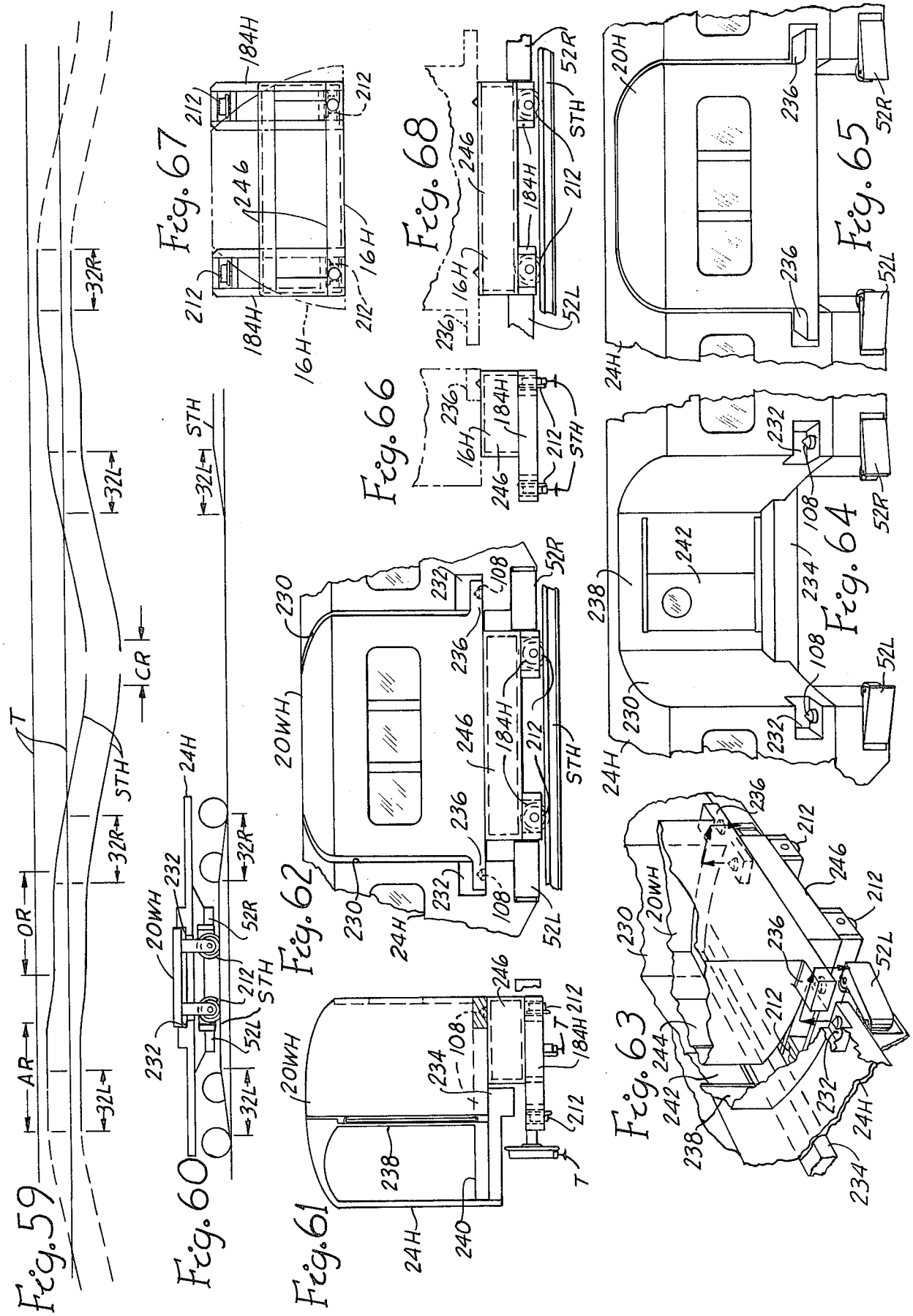

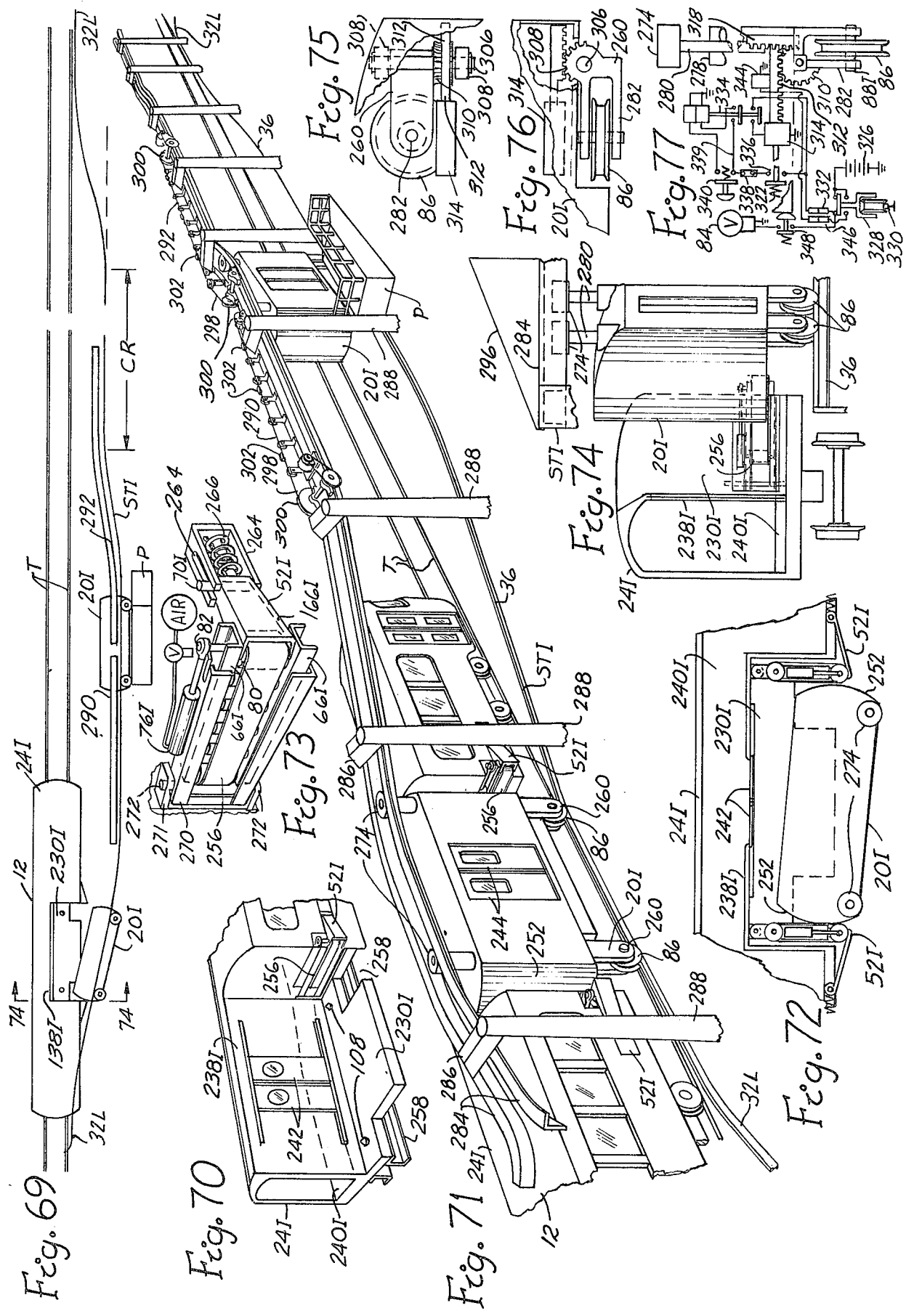

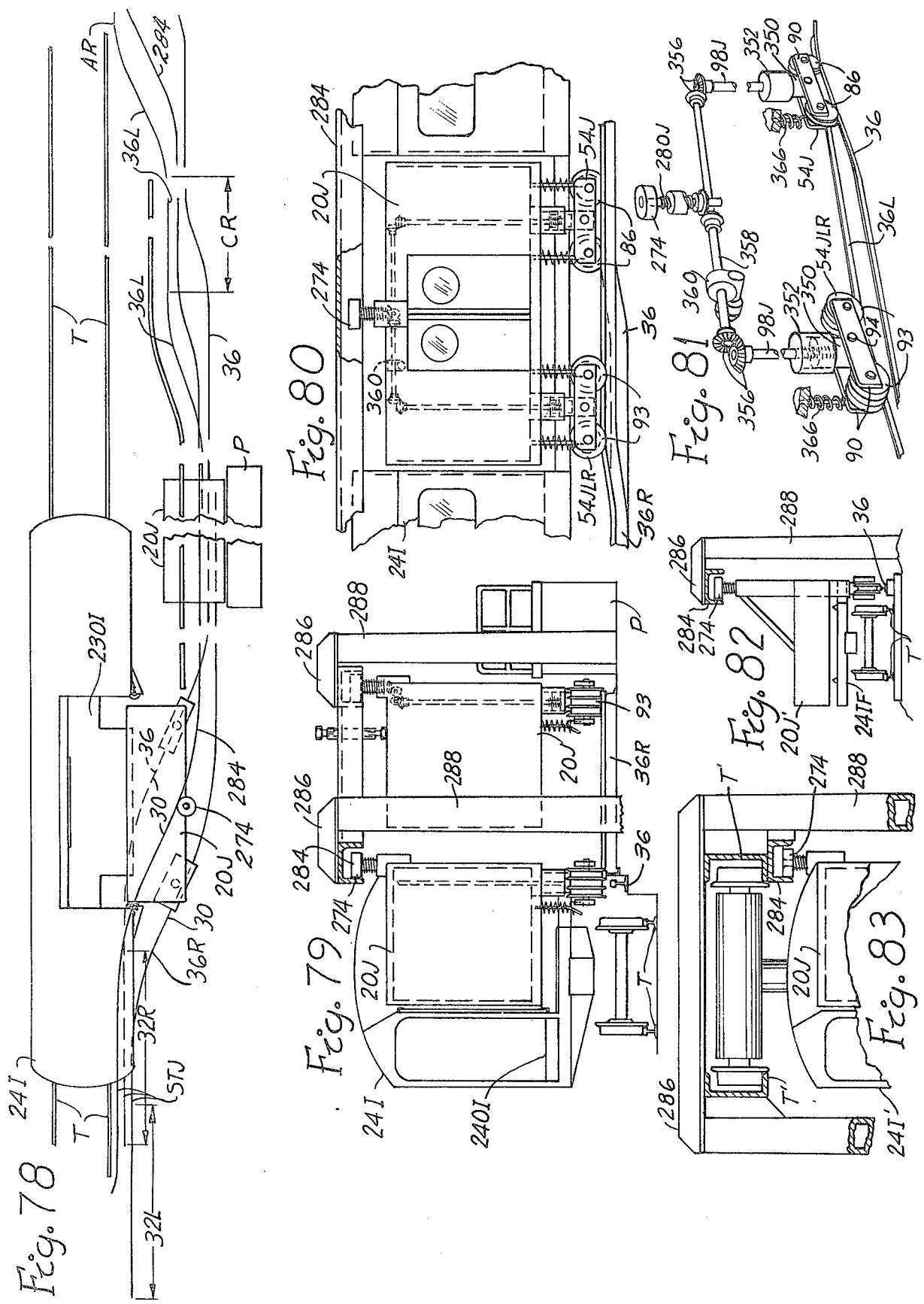

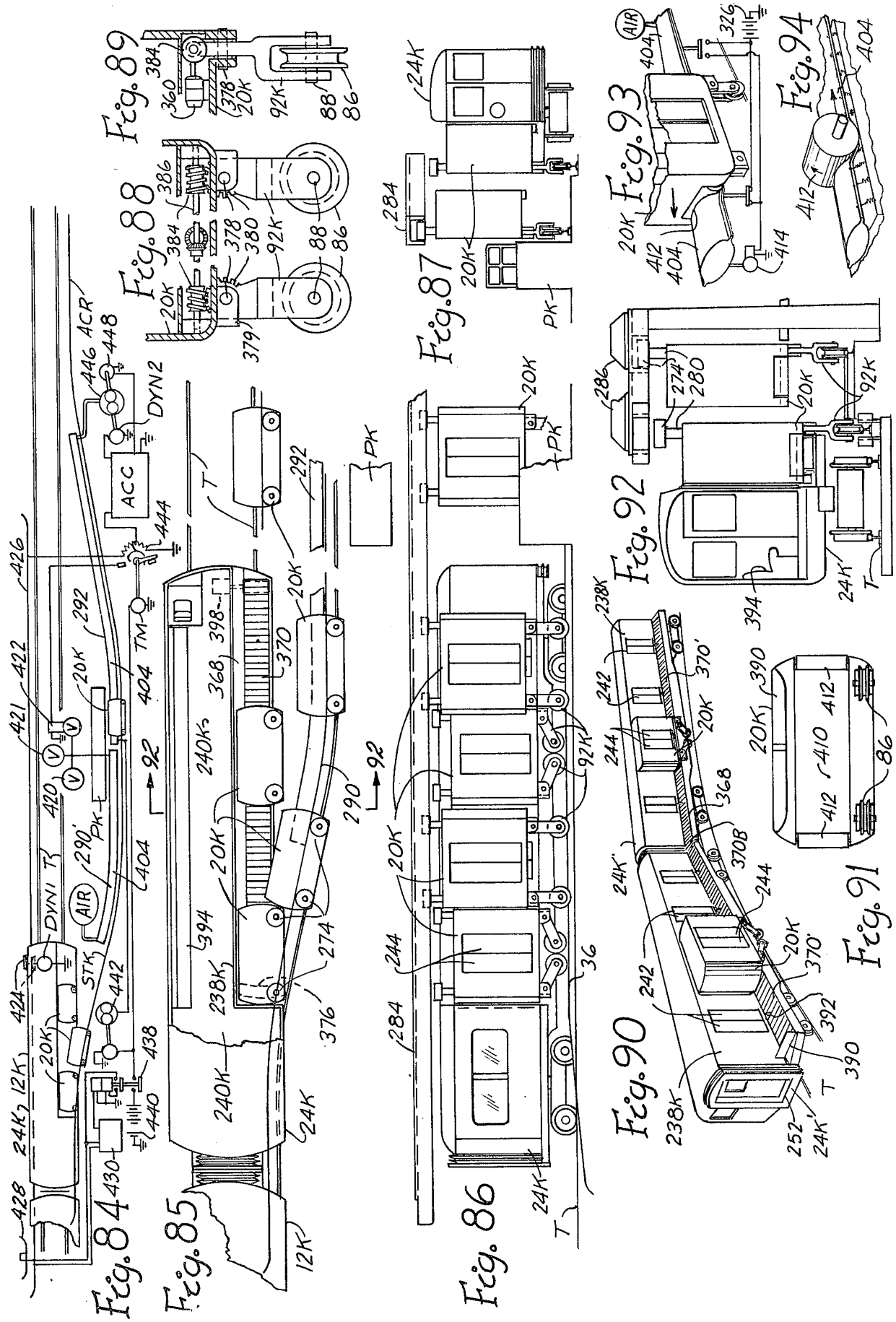

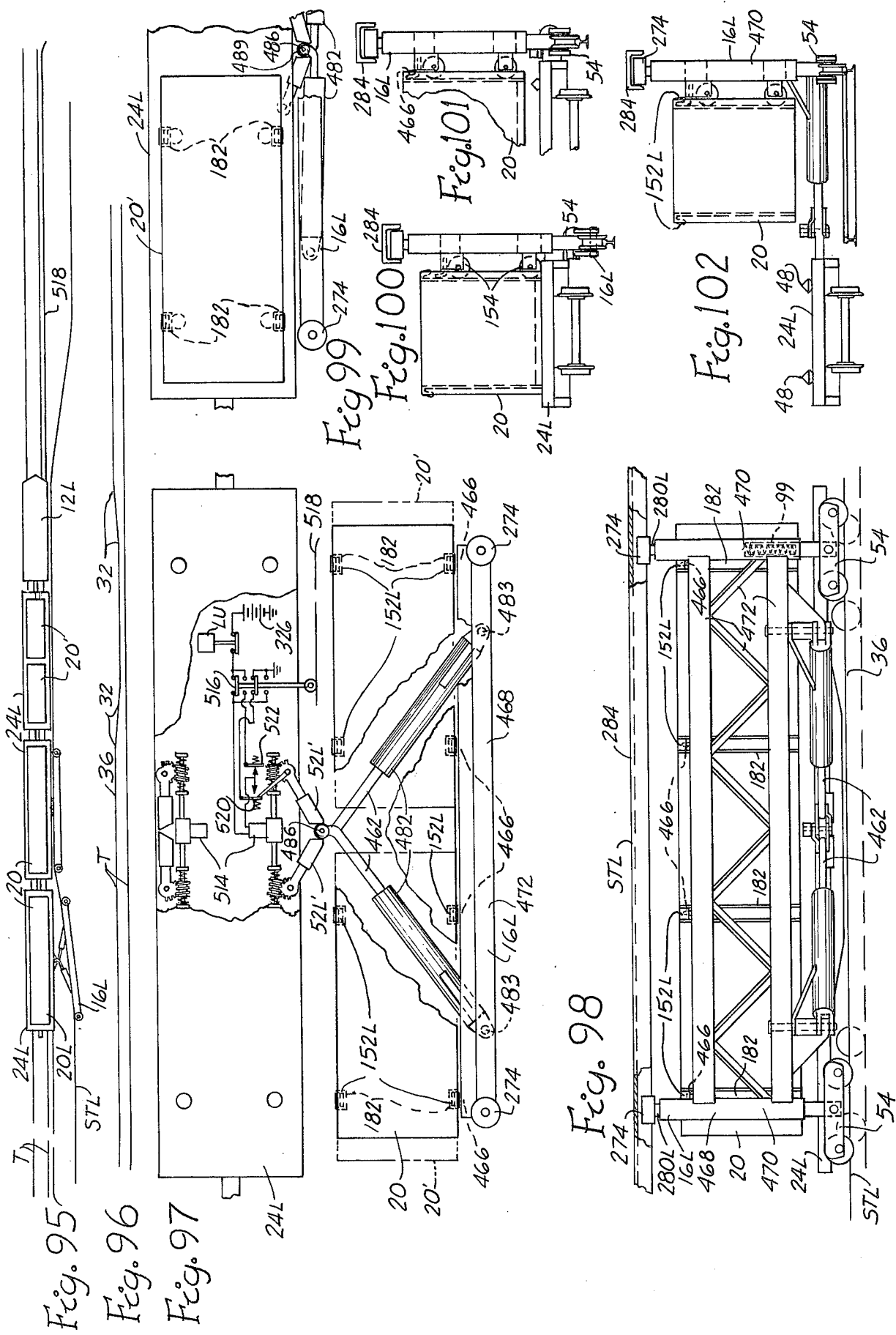

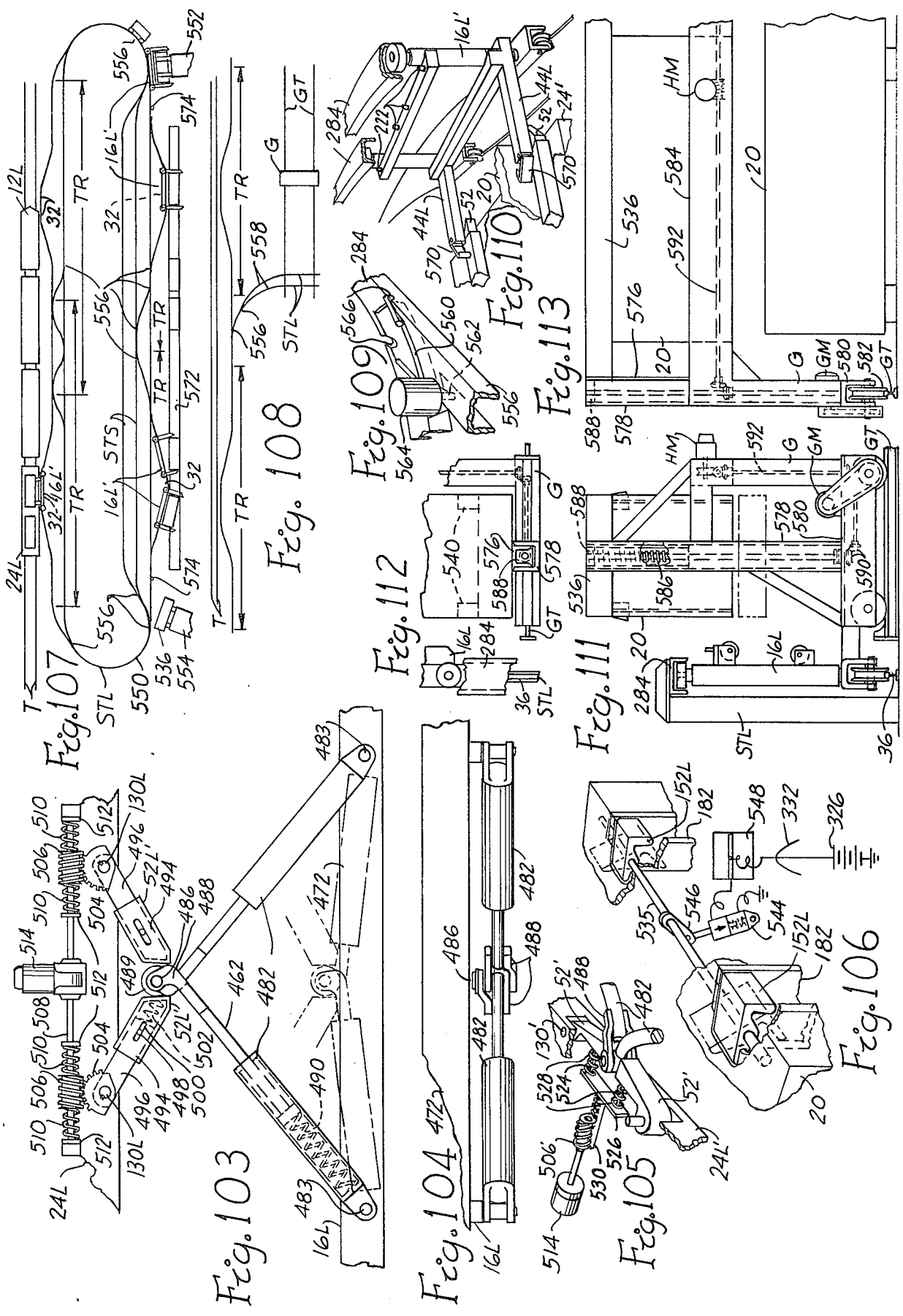

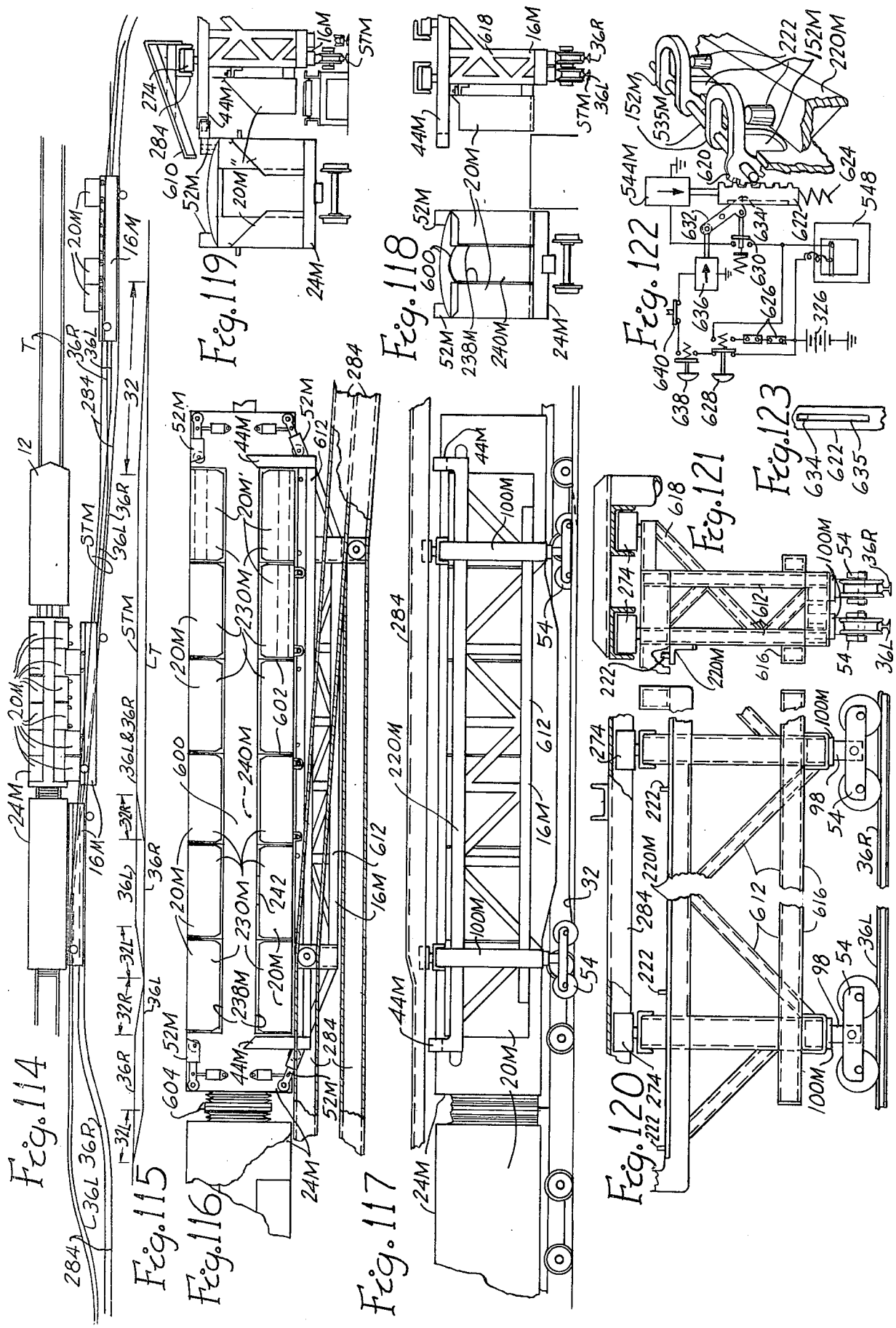

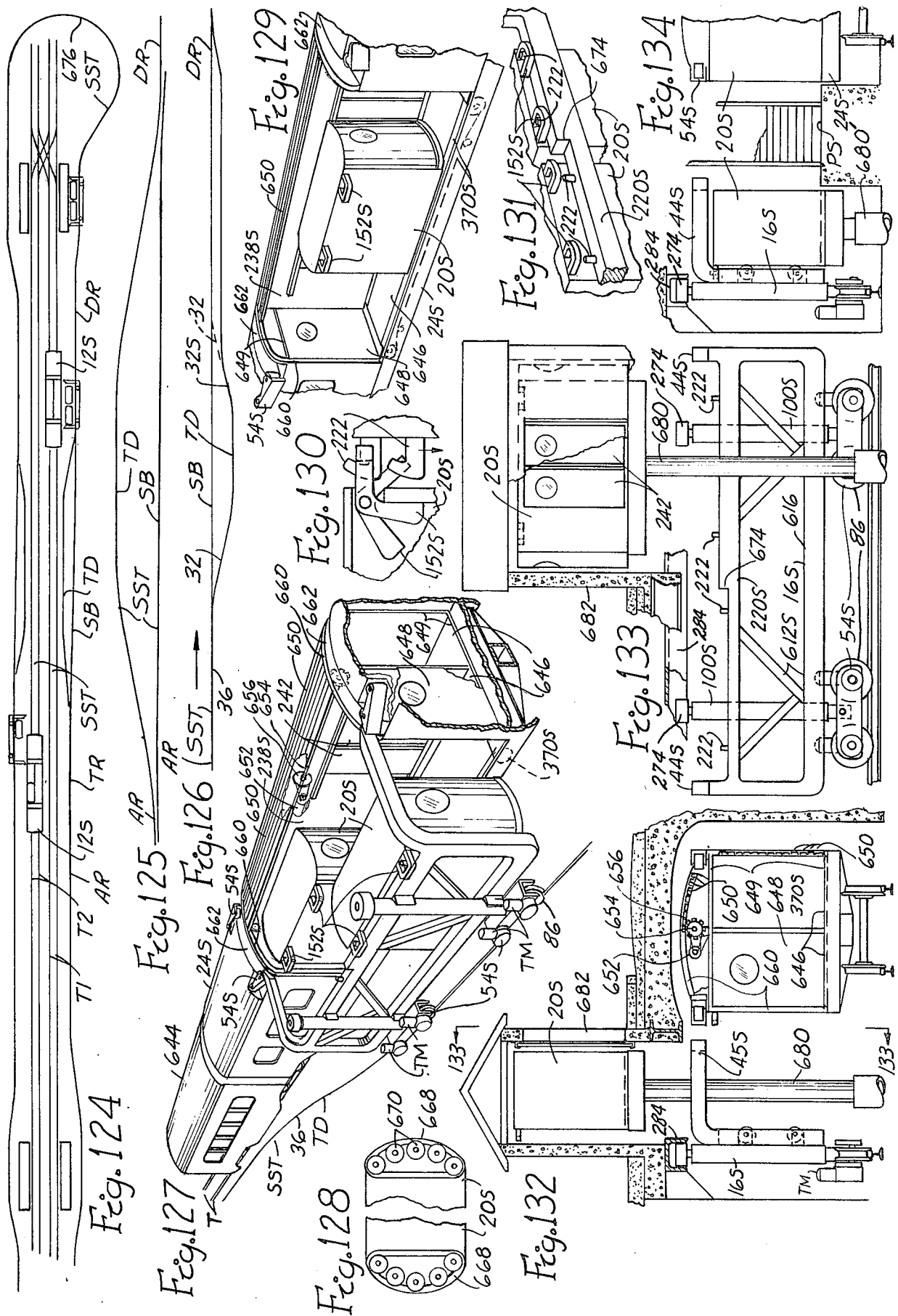

SIDE RAILS CONTAINER TRANSFER SYSTEM

CROSS REFERENCE TO RELATED APPLICATIONS

This application is a continuation of Ser. No. 528,948 filed Dec. 2, 1974, now abandoned in favor of this application. way including This application is related to application Ser. No. 428,973, filed Dec. 12, 1973, now abandoned in favor of Ser. No. 591,101, filed June 27, 1975, now U.S. Pat. No. 4,065,006. This application is also related to U.S. Pat. No. 3,528,569 and others referred to in the text.

This invention has several embodiments and adaptations to different types of service. It is applicable for passengers, baggage, express, mail and freight. It provides traveling interchange for containers to and from trucks, trailers, conveyors and railways including monorails and subways. It can interchange semitrailers between railway cars and traveling platforms. It is useful in minature as a toy. An object of this invention is to put full weight of the station vehicle and/or container on a cam track to provide surer tracking for the wheels, cam riders, or trucks, and to eliminate transfer mechanisms of my prior application to simplify, increase dependability, and reduce costs. It is an object to provide a side-transfer carrier having fixed lift fork arms and supporting cam rider swivel trucks for running on double displacement rails of cam track to move the carrier into and outfrom a vehicle all while parallel thereto rather than provide telescoping arms and transfer mechanism as in my U.S. Pat. No. 4,065,006. It is an object to move containers and carriers sidewise at right angles to the vehicle to transfer containers to and from close fitting openings and so the forks can serve for coupling the carrier to the vehicle.

Some other or further objects are to provide simplified side coupling, to provide side transfer carriers which can be moved easily by truck when sidecoupled thereto, to provide container carriers which need no adjustment for transfer of containers between road and rail vehicles so they always align when positioned for side coupling, to provide a transfer carrier which cannot get out of adjustment —by eliminating adjustments, to provide cam truck lift slopes at the side or center of the truck driveway so not to interfere with truck wheels and to provide for transfer between the carrier and train with the carrier track rail at the side or between rails of the railway to cross at grade with lift slopes between and staggered container mounts whereby containers can be lifted therefrom and lowered back a few inches transversely so the carrier track rail can always cross the railway rail at grade.

Some objects for specific applications are to provide narrow carriers having a vertical frame held by a top rail from tipping, to take less space along the right-of-way, to provide for side transfer in subways where space is at a premium, to provide narrow container transfer along cars so passengers can easily leave and enter the cars without walking through a crowded train, to apply this system to various types of railway operations and for various kinds and densities of service, to provide a seating area all along the container area, to provide inexpensive containers and a propulsion system to accelerate and decelerate them to and from train coupling speed, to provide for reversing subway container cars so containers can be transferred from opposite sides on opposite runs, to provide elevators for lifting the containers to street level without crossing over the subway tracks and for shifting containers on the carriers and cars, to provide side transfer track with stepped dip that returns partway up with carrier for two containers each at slightly different level to load one and unload another simultaneously from a car along a transfer run, to provide dip for unloading all the containers at end of route to move them over to use opposite side of the subway cars for containers on return run, to reduce the cost of the transfer run, cars, carriers and subway for nonstop container transfer, and to provide container handling means for unloading the carriers for storage and reloading.

These and other objects, features and advantages should become apparent from study hereof by those skilled in the art or will be pointed out in the description of this invention with reference to the drawings wherein:

FIG. 1 is a plan of a highway to rail cam track transfer station with transfer carriers on station cam track transfer runs.

FIG. 2 is an elevation view of the station track and caster ways of and aligning FIG. 1.

FIG. 3 is an end view of a container being transferred to a truck or trailer bed by the cam truck transfer carrier.

FIG. 4 is a perspective of the station with a truck receiving a container from a transfer carrier and carriers delivering containers to a train.

FIG. 5 is a perspective of a transfer carrier side coupled to a railway car to transfer a container. Optional hand rails are shown on carrier.

FIGS. 6 and 7 are respectively top and transverse views of a portion of a railway car to show a side coupling latch about to engage a fork arm of a transfer carrier.

FIGS. 8, 9, and 10 are respectively end views of the left and right end cam trucks for the carrier and a side view of either truck.

FIGS. 11, 12, and 13 are respectively side, end, and plan views of a special caster for the carrier.

FIGS. 14 and 15 are respectively plan and side views of the retractable-pedestal flat-bed truck trailer with a container lifted and side couplings inserted ready for transfer.

FIG. 16 is a transverse sectional view through lifting pedestals and their operating gear on the trailer with the container lowered.

FIGS. 17 and 18 are plan and side views of a removeable coupling latch on the trailer.

FIGS. 19 and 20 are plan and side views of portion of the railway car with a container.

FIG. 21 is a modified side view of portion of a car with a container having transverse fork pockets.

FIGS. 22 and 23 are plan and end views of a side coupling latch retracted on the railway car of FIG. 21. scraping FIGS. 24, 25, and 26 coupling respectively plan, side, and end views of a modified carrier loading a container on railway car of FIG. 21 at a station with double-side-rails transfer track.

FIG. 27 is a plan view to reduced scale of the double side transfer track with two of these carriers schematically thereon with bumpers added.

FIG. 28 is track elevation of and aligning FIG. 27.

FIG. 29 is an end view of one of these carriers lifting a container from the truck bed pedestals.

FIG. 30 is a perspective of a variation of the carrier having forks turned up engaging ends in pockets on a side at top of a container and lifting the from a transport vehicle.

FIG. 31 is the double-side rails station plan with added run for handling trailers.

FIGS. 32, 33, and 34 are respectively plan, side, and end views of a railway pedestal car with a semi-trailer being transferred by a carrier on the track of FIG. 31.

FIG. 35 is a side view of the carrier on the track of FIG. 31 along the top of a terrace to be at height for transfer of trailers to or from the railway car.

FIG. 36 is side elevation of a trailer on traveling platform on a track at the station of FIG. 31.

FIG. 37 is an end view of the trailer being transferred to or from FIG. 38 is an end view of a variation of the carrier having vertical lift forks transferring a trailer having side lifting pockets.

FIG. 39 is a plan of a variation showing a double track transfer run that crosses into the section of railway track.

FIG. 40 is an aligned elevation of FIG. 39.

FIG. 41 is a plan view to a larger scale of the modified carrier engaging a modified container on a car passing the station track of FIGS. 39–40.

FIG. 42 is a section of this carrier on line 42—42 FIGS. FIG. 41.

FIG. 43 is end view of FIG. 41.

FIG. 44 is a side view of the carrier of FIG. 41.

FIGS. 45 and 46 are respectively plan and side views of a swivel truck on end of a leg for reaching under the on car for supporting the carrier of FIGS. 41–44.

FIG. 47 is a plan view of the swivel truck for supporting the leg at the opposite end of the carrier of FIG. 41 (the side view being same as FIG. 46).

FIG. 48 is a section on line 48—48 of FIG. 46.

FIG. 49 is a variation of the station track plan for carriers having a frame mounted on a small swivel truck at each end.

FIG. 50 is an aligned schematic elevation of the track of FIG. 49.

FIG. 51 is the rail crossing plan enlarged from FIG. 49 with rails between curves and crossings omitted.

FIGS. 52, 53, and 54 are respectively plan, side, and end views of this carrier underreaching a container on the car of FIG. 41 in a train passing the station tracks of FIG. 49. The container can be separable or secured to arms of the carrier.

FIG. 55 is a perspective of the carrier of FIGS. 52–54.

FIGS. 56 and 57 are sectional views on lines 56—56 and 57—57 of FIG. 55.

FIG. 58 is a perspective of a variation of the carrier with vertical forks with a header having prongs engaging containers on a transport vehicle.

FIG. 59 is a station track plan variation with opposite transfer runs for lifting four-wheeled carriers or containers from a railway car moving in either direction.

FIG. 60 is an aligned elevation view for the transfer runs of FIG. 59.

FIGS. 61 and 62 are respectively end and side views of a four-wheeled container in the central portion of a railroad passenger car for transfer on the track of FIGS. 59–60.

FIG. 63 is a cut-a-way perspective of a container on the railway car of FIGS. 59–62.

FIGS. 64 and 65 are perspective views of the container berth on the railway car of FIGS. 60–63 respectively empty and with container.

FIGS. 66, 67, and 68 are respectively end, plan, and side views of the four-wheeled carrier for containers for track of FIGS. 59–60.

FIG. 69 is a plan view of a variation of the station along a railway with a single car train passing a container to the station and container ready to be accelerated to be side coupled to the car to replace the container removed.

FIG. 70 is a perspective of portion of the car of FIG. 69 including its empty container berth.

FIG. 71 is a perspective of the car approaching the station platform of FIG. 69.

FIG. 72 is a plan view of the berth area of the car with container being transferred.

FIG. 73 is a perspective of a coupling latch and bumper belt in an end of the container berth of this car.

FIG. 74 is a section on line 74—74 of FIG. 69 to larger scale.

FIGS. 75 and 76 are respectively plan and end views of a corner of this container to show a retracted transfer wheel.

FIG. 77 is an end elevation of the corner of this container with the transfer wheel extended and controls shown schematically.

FIG. 78 is a plan view of a station on the railway with the car of FIGS. 69–74 transferring a variation of the container having swivel trucks engaging double displacement station tracks for parallel transfer from the car and a like container under a cable dog accelerator to move it to coupling position for transfer into the car.

FIG. 79 is an end sectional elevation of the station of FIG. 78, to larger scale, with one container at the platform and one in the car.

FIG. 80 is a side view of a portion of FIG. 79 showing a portion of the car with a container lifted by the station track.

FIG. 81 is a perspective of trucks and wheel retractors for containers of FIGS. 78–80.

FIG. 82 is an end view of a flat car with a full-width open container engaging transfer track of FIGS. 78–81.

FIG. 83 is a variation of a portion of FIG. 79 to show the car modified for and on suspended track.

FIG. 84 is a plan view of a variation of the railway with a station receiving containers from and transferring containers to a train moving left to right past the station with schematic of controls for accelerating and stopping the container at the station.

FIGS. 85, 86, and 87 are respectively plan, side, and end views of a car passing a station similar to FIG. 84 except to larger scale and having a platform on the near side.

FIGS. 88 and 89 are respectively side and end elevations of lower wheels arms and lifters on the coantainers of FIGS. 84–87.

FIG. 90 is a perspective of two of a variation of these container cars in a train.

FIG. 91 is bottom view of a container for the cars of FIGS. 84–90.

FIG. 92 is a section on line 92—92 of FIG. 85 to larger scale.

FIGS. 93 and 94 are perspectives of respectively the bottom portion of a container on an air bag for propulsion and a roller on the bag to show the principle of operation.

FIG. 95 is a variation in plan view of a train passing a station track with carriers transferring containers on and off cars in the train.

FIG. 96 is an aligned side elevation of tracks of FIG. 95.

FIGS. 97 and 98 are respectively plan and side views of a carrier with a container coupled to a car in the train of FIG. 95 to larger scale.

FIG. 99 is a plan view of an end of a car with a 20' container being engaged by the carrier of FIGS. 97-98.

FIGS. 100, 101, and 102 are end views of the carrier of FIGS. 97-98 respectively engaging, lifting, and having removed the container from the car.

FIGS. 103 and 104 are repectively plan and side elevations of side coupling between a car and a carrier of FIGS. 95 and 97-102 to larger scale.

FIG. 105 is a prespective of this coupling engaged by latches on the car.

FIG. 106 is a perspective of retractable hook pockets on a side of the container with controls therefor.

FIGS. 107 and 108 are some station plans.

FIG. 109 is a perspective of a switch for the overhead brace rail.

FIG. 110 is a perspective of a variation of the load transfer carrier station of FIG. 108

FIGS. 111, 112, and 113 are respectively end, half a side, and partial plan views of a container storage gantry and a carrier for containers at a these stations.

FIG. 114 is a plan view of portion of a railway showing a variation with a train moving in either direction past a station track having double displacement lower and upper rails along the railway with carriers transferring containers to or from the train.

FIG. 115 is a side view elevation of the station track of FIG. 114 aligned.

FIGS. 116 and 117 are respectively plan and side views of a portion of the train of FIG. 114 to larger scale with transfer carrier engaging containers on a car therein.

FIGS. 118 and 119 are end sectional views of carriers serving cars in the train of FIG. 114.

FIGS. 120 and 121 are broken side and end views of a carrier on this station track to larger scale.

FIG. 122 is a schematic of a ticket and push-button transfer control on a container for lifting eyes for transfer from the train.

FIG. 123 is a rear view of a latch track on back of the gear rack in FIG. 122.

FIG. 124 is a plan of portion of a variation for a subway typical of its full length.

FIGS. 125 and 126 are aligned track plan and elevation of a transfer run for this subway.

FIG. 127 is a perspective of a portion of a train with a carrier on this station track after inserting the rear container and removing the forward container from a car in the train.

FIG. 128 is a broken plan view of a container to show bumper belts.

FIG. 129 is a perspective of a portion of the car with a container moving forward in the container berth area before doors are opened.

FIG. 130 is an end sectional view of container eyes on two containers in this car engaged by a stepped hook beam on the carrier to lift out only the forward container.

FIG. 131 is a perspective of the stepped hook beam engaging only one of the two containers.

FIG. 132 is an end elevation of this car and carrier and container on an elevator lifted to a subway staion at street elevation.

FIG. 133 is a section line 133—133 of FIG. 132.

FIG. 134 is an end view of the carrier with a container at a platform station of FIG. 124.

Referring to the drawings and in particular to FIGS. 1-5 where train 12 on track T is passing transfer track ST with container carriers 16 thereon each for transferring a container 20 between a car 24 in train 12 and flat bed 26 of truck or trailer 28 or vice versa according to the direction of movement along the transfer runs. Track ST has a railway side transfer run TR and a truckway transfer run TR' connected by emough track which can include sidings for storing and sorting carriers having containers. Empty carrier storage is on each end of track ST. Each transfer run has transfer displacement curves 30 and lift slopes 32 between two coupling runs CR. Track ST has a central rail 36 and lengths of rail 36R on right hand 36L on left added along the displacement curves to left and right repectively as viewed from low end of the diaplacement transfer offset to the left in FIGS. 1 and 4. These displacement curves 30 in rails 36 and 36R or 36L guide the carrier 16 against car 24 or trailer 28 and slopes 32 lift or lower the carrier to lift or lower the container according to direction of travel therealong before guiding the carrier away from the vehicle side coupled. The station track is elevated from displacement slope 32 on run TR to slope 32 on run TR', FIG. 2 aligning FIG. 1, or from these slopes to where container on carrier will clear over car or trailer bed for transfer on or off. A truck driveway TD is provided with guide line or curbs 40, for the truck driver to drive along the side of transfer run TR' aligned from left to right to unload container a to a carrier 16 or right to left to receive a container from the carrier Track T could be in pavement along transfer run TR for transfer of containers to or from trains and trucks, but it is preferred to have a separate run for trucks so as not to interfere with trains and to be at correct height if containers rest at a different height on railrod cars than on the trucks for transfer.

Each carrier 16 has a rectangular box like frame 42 with fork arms 44L and 44R secured extending horizontally from top of one side of the frame to reach under container 20 preferably supported on pedestals 46 on car 24 or on jack pedestals 48 on trailer bed 26 for the forks to clear under the container. the forks have conical locators 49 which engage in dents in bottom of containers. Forks 44L and 44R extend out beyond container 20 thereon and have opposite horizontal tabers 50 to latch between side couplers 52 on car 24 or between removeable side couplers 52R and 52L on trailer 28. Additional forks 45, FIG. 5, are provided for supporting long containers and reach only to the opposite side of the container. Box 42 is supported on swivel trucks 54 and 54LR on track ST respectively under left and right ends of both sides or as shown in FIGS. 1-5 only on side from which arms 44 extend and on a swivel caster 56 at each end on the opposite side. Casters 56 are secured out of alignment as viewed transversely so they will track on separate slopes 32'. A paved way 58 for both casters follows along as part of track ST and has separate inclines 32' for each caster to lift ends of carrier simultaneously substantially level along the carriers' track and paved ways. Carrier 16 is counterweighted with concrete 60 to carry containers 20 out on the forks. The frame of the carrrier is covered with deck plate 62 to make it a traveling loading platform and can have railings 64 as desired.

Latching couplers 52, mounted two on each side of car 24, each have a rectangular latch tube 66, FIGS. 6 and 7, which slides in housing 68 secured on pin 70 secured to turn in sleeve 72 in bed of car 24 at inner end and cushioned by spring 74 to absorb low speed coupling shock deflecting about pin 70 from stop 75 which normally holds the couplers transverse to the car. Tube 66 is connected to the rod end of an air cylinder 76 whose head end is secured in pivot end of housing 68. The outer end of each tube 66 has an opposite horizontal taper 78 parallel the taper 50 on the fork for coupling therewith to latch the forks between these couplings from either direction the car is moving to couple the carrier on a coupling run for a transfer run. A wheel 80 on vertical pin 82 is pocketed at the outer end in each latch tube 66 to roll the forks in and out from the car side to which they are coupled. Connection of air pressure reservoir AIR on the car is through solenoid valve 84 to both cylinders 76 on one side of the car to extend for coupling the lead carrier on a coupling run when the car and carrier are set up for transfer. Valve 84 is controlled as valve 869 in FIG. 51 of my U.S. Pat. No. 3,483,829 to extend side couplers.

Referring to FIGS. 8–10, truck 54 has two single grooved wheels 86 each mounted on an axle 88 mounted in bearings between side plates 90 connecting the axles parallel, the side plates being connected by end plates 91 to form a rigid truck frame 92. Truck 54LR is the same as truck 54 except a threegrooved wheel 93 is mounted on each of the two shafts 88 to run on rails 36L and 36R and optionally 36. Truck frame 92 is mounted to tilt on transverse pin 94 through a straddling yoke or inner knuckle on the bottom of a central vertical tube 98 supporting coil spring 99 to move up and down and turn in a vertical tube 100 secured to frame of the carrier. Rails 36L and 36R are raised enough for flanges of wheels 93 to clear over top of rail 36 where these rails curve from rail 36 as in FIG. 37 of my U.S. Pat. No. 4,065,006.

Cam track rails on the fork side of the carrier are sufficient to guide the carrier. The other side can be supported on special casters 56 which reverse without swiveling thus eliminating need for an accurately positioned second track for a second set of trucks 54 and 54LR. Ordinarily caster diplace the object they support as they swivel when direction of movement is reversed, but, since track ST prevents displacement of the carrier, my caster wheels are mounted to teeter totter instead of pivoting longitudinally when reversing direction of operation. Each caster 56, FIGS. 11–13, has a neoprene treaded wheel 102 mounted on axle 103 between forks of caster frame 104 pivotally secured on pin 105 between depending sides of swivel mounting bracket 106 having a flat bottom against which the top fork frame 104 rests in either of two oppositely tilted positions to caster in either direction but reverse without swiveling. Casters 56 are secured out of alignment as viewed transversely so they will track separate slopes 32'. The caster wheels can be 86 and 93 respectively on the caster at the left and right end of the carrier to operate on a second set of aligned rails of track ST.

Referring to FIGS. 14–18 the truck or trailer 28 has four lift pedestals 48 with locating catches or cone topped short cylinders 108 on top of the pedestals to secure the container flush to truck or trailer bed 26 for movement on streets. Pedestals 48 lift together by cranking to a height for forks to clear under the container to lift and release the container from the locators or preferably from latch-downs as in my U.S. Pat. No. 3,528,569.

Each pedestal 48 is a jack which has a square tube 110 which telescopes in a square housing tube 112. The top of the tube 110 is covered by locator catch 108 secured thereon. A nut 116 is secured in the bottom end of tube 110. A threaded rod 118 is turned in nut 116 by gearing 120 and shafting 122 connecting each screw 118 to turn jacks to uniform height by turning shafting 122 which extends out to a side of the trailer with square end 124 for cranking the jacks up and down. The jacks are raised to receive a container from a carrier or deliver it thereto when the trailer is side coupled to a carrier and moved along a transfer run and are jacked down to set a container on bed 26 for highway movement.

Side coupling latches 52pL and 52pR, FIGS. 14, 15, 17 and 18 are inserted in holes 126 on sides of bed 26 of trailer 28 to engage forks 44L and 44R of the carrier therebetween to move along a transfer run therewith for transfer of a container to or from the trailer. Latches 52pL and 52pR each have a latch plate 128 bent in the form of a check mark and secured at its tail to vertical pin 130 extending down into tube 132 having two pins 134 for insertion into holes 126 in bed 26 and secured therein by ball and dent 136 for removal after transfer. A spring 137 is secured to plate 128 and bent back to engage the side of bed 26 to extend the latch to recess when engaged by the tapered slope on the end of fork 44L or 44R. A roller 80 mounted in the head of latch plate 128 reduces coupling friction and noise. The left and right hand coupling latches are inserted by hand for use just along the transfer run and withdrawn for highway movement.

As seen in FIGS. 19–20, cars 24 have pedestals 46 arranged as on trailer 26 to support containers 20 above the bed of car 24 at a height for forks 44L and 44R to reach under.

Optionally the container 20' has fork pockets 140, FIG. 21, to set down on the bed of car 24' having locators 108 on the bed instead of pedestals and couplers 52L and 52R as shown in FIGS. 21–23 along side the container spots replacing couplers 52 under the container. Couplers 52L and 52R each have a shock absorber tube 66' which slides in housing 68' secured on vertical pivot pin 70' in the bed of car 24'. Outer end of tube 66' has taper 78' and a wheel 80. Right and left hand couplers 52R and 52L extend endward respectively from right and left end fork pocket locations to latch forks 44R and 44L therebetween when the couplers are swung out at about 20 degrees by air cylinder 76' pivotally connected between the bed of car 24' and pivot end of housing 68' in from pin 70'. Spring 148 cushions coupling impact in housing 68'. Cylinders 76' are connected and controlled similar to cylinders 76 to selectively extend from either side for coupling a carrier for a transfer run.

Referring to FIGS. 24–26 for a variation, carrier 16A has a frame 42A as long as car 24A and two end forks 44L and 44R for coupling only. Car 24A is the same as car 24 except its side coupler 52L and 52R face opposite ends along each side to engage between forks 44L and 44R. Carrier 16A has four inner forks 45A secured in adjacent pairs parallel on pins 144 to pivot on frame 42A and partially counterweighted to be swung up out of the way or swung down for extending either pair under a short container or both under a long container for selective transfer. Frame 42A has four transverse channels 146 turned legs up each to hold a fork 45A laterally and horizontally therein on pins 144 therethrough. The web of each channel 146 is cut away about pin 144 and inward at a hole 148 in frame 42A so forks 45A which are partially counterweighted can be swung up past vertical so they will not interfere with transfer when only the other set of forks 45A is to be used for a transfer of a short container. The inner ends of forks 45A are recessed on top to fit under a longitudinal angle 149 along the top of frame 42A to help distribute load and hold forks horizontal.

Frame 42A is supported on two trucks 54 at the left end and two trucks 54LR at the right end to run on two sets of rails 36, 36L and 36R spaced as in FIGS. 27-28 for a transfer run in station track STA. The trucks are arranged in a rectangular pattern to guide on identical sets of rails aligned for the carriers to operate without turning along the transfer runs except to follow any curves in track T. Both sets of rails have transfer inclines 32, FIG. 28, to lift a container off either a car or truck 26 as in FIG. 29. The transfer run is along track T, FIG. 26, or along truck drive TD or both by embeding track T in pavement along the transfer run, FIG. 29, so the one transfer run can be used for both truck and rail transfers.

CARRIER WITH VERTICAL LIFT ARMS

Referring to variation, FIG. 30, carrier 16B is the same as 16A except vertical fork arms 45V replace arms 45A. Arms 45V extend up from a side of carrier 16B and engage in pockets 152 at top of a side of container 20 on car 24A when the car pushes the carrier coupled thereto up slope 32 along the transfer run of FIGS. 27-28. A wheel 154 at the top and bottom on each arm 45V rolls on the side of the container to eliminate scraping while arms are engaging or disengaging the container. The wheels 154 at the bottom hold the container out from arms 45V substantially level. Arms 45V can be mounted rigid or in pairs on pins 144 to be swung in slightly when empty to avoid transfer of a short container from car 24A when the carrier is coupled for transfer of an adjacent container. This carrier will likewise transfer containers to and from beds of trucks slowly driven along the transfer run side coupled to the carrier, the couplers 52pL and 52pR being inserted in holes 126' in bed 26 to face endward to latch between forks 44L and 44R. The lift inclines 32 of track STA lift arms 45V into pockets 152 and lift the container up from car 24 or bed 26 before the can track STA guides the carrier with container away from the car or truck or the reverse for loading the container on the car or truck.

Referring to FIGS 31-37, the station track STA is run on top of a terrace 160 along side of track T for transferring semitrailer 20C with carriers 16C to and from railway cars 24C in train 12. Cars 24C have end pedestals 162 and double pedestals 164 at the center along each side for supporting two 20 foot or one 40 foot trailer 20C on locators or latch downs 108 as in my U.S. Pat. No. 3,677,194. Carrier 16C has forks 44L and 44R extending from a side to couple between latches 52 on car 24C. Latches 52 are mounted with cylinders 76 secured transversely onto and between pedestals 164 to be straddled by inner fork arms 44L and 44R which are each mounted to swing horizontally on a pin 166 against restoring force of springs 168 in pockets 170 on each side of each arm to deflect coupling shock. The carrier can be moved on track STA into coupling proximity just ahead of alignment with car 24C to couple forks 44L and 44R between latches 52. The carriers for trailers are similar to or the same as carriers for containers and run on transfer runs at grade for transfer of containers.

The trailer can be loaded on or removed from the carrier by various overhead transfer devices or fork lifts, or peferably the station has a low platform car 174 on track 176 at grade along side transfer run TR', FIGS. 31, 36 and 37, for transfer of this trailer to and from carriers 16C. Trailer 20C is driven onto platform car 174 by tractor 28T. Car 174 has end ramps 178 lifted a few inches by springs 180 and lowered by truck wheels when the trailer is driven on or off. After the trailer is driven onto car 174 its parking wheels are lowered, and tractor 28T uncoupled and driven off. Next a carrier 16C is moved along by any suitable means and side coupled to the trailer on platform car 174 to move along the transfer run extend forks under the trailer and lift it off platform 174 with rise 32 in track STA and move it out from a side of platform 174 to position for side coupling to a car 24C in train for transfer thereto.

Carrier 16D, FIG. 38, is similar to carrier 16C except forks 45V extend up vertically instead of horizontal forks 45 and engage in pockets 152 at top of channels 182 in side of trailer 20C for lifting with carrier 16D on track STA and is similarly side coupled and used with platform car 174.

CARRIER WITH LEGS EXTENDING UNDER CAR

To give added stability to the carrier with reduction of counterweight, total weight, and width, the carrier 16E and its station track STE, FIGS. 39-48, are arranged to extend under car 24. Carrier 16E has a rectangular frame 42E with two legs 184 of I-section extending from the bottom out each end of the side facing car 24 to reach thereunder. The outer ends of legs 184 have the web removed to provide forks in which low swivel trucks 54E and 54ELR are mounted each on a vertical pin 186 and respectively replacing trucks 54 and 54LR at left and right ends of the carrier. The outer side of carrier 16E is also supported on trucks 54E and 54ELR at respectively the left and right ends. Coupling forks 44L and 44R and any additional lift forks 45 are secured extending from the side of frame 42E above legs 184 to reach into the opening under container 20E having pedestals 46E on its bottom engaging on pedestals 46 on car 24.

Cam track STE, FIGS. 39 and 40, for carrier 16E has a through rail 36 and left and right-hand rails 36L and 36R for each side of the carrier as does track STA. The transfer run of station track STE has a coupling run CR, offset run OR, alignment run AR, and coupling run CR connected in succession by displacement curves. Rails 36, 36L and 36R for side of carrier facing car 24 cross the near rail of track T at level. Track STE is elevated between slope 32L in each rail of offset run to corresponding slope 32R in each rail of the alignment run. The raised run is only along where one side of track STE is between rails of track T, so the crossings of rail of track T can be at grade. The four slopes 32L and likewise the four slopes 32R are spaced at truck centers so each of the four trucks on the carrier is simultaneously lifted or lowered equally according to direction of movement to support the carrier substantially parallel with track T. Car 24 on track T has pedestals 46 spaced in a row along each side the same, the rows being shifted from aligning transversely. Container 20E for this car has corresponding pedestals 46E with locating holddowns 108 built in to engage with catches on pedestals 46 either end forward. The offset stacking pedestals 46 and 46E are of substantially equal and sufficient height so container 20E on carrier 16E can be moved in or out over car 24 on grade level of track STE to or from position along the offset run where the pedestals on the container each nearly meet a pedestal on car 24 before or after being lifted (about five inches full scale) through the distance between slopes 32L and 32R to clear for movement in or out on displacement curves in track STE (about ten inches full scale) to position pedestals 46E over pedestals 46 before the container is set down thereon when the carrier descends slopes 32R in moving left to right or to offset pedestals 46E from 46 in moving right to left.

Trucks 54E each have two axles 88 each with a central double flanged wheel 86 for running on rail 36 and mounted in bearings between side plates 90E of frame 92E. A central joint block 190, FIG. 47, on pin 96 between the side plates has aligned central vertical pins 186 through top and bottom fork ends of legs 184 on spring 99E on pin 186 above block 190. Truck 54ELR is the same as truck 54E except it has a wider frame 92E' for a three-grooved wheel 93 on each axle 88 for running on rails 36, 36L and 36R. Side plates 90 are shaped as shown, FIG. 46, curving in with narrow necks each side of pivot 96 to teeter closely between top and bottom forks of legs 184.

Track STE carries each truck 54E and 54ELR on identical curves and inclines simultaneously along the transfer run to keep the carrier parallel car 24 to keep coupling forks engaged between latches 52 to guide straight in and out on car 24. Track STE can curve out further beyond ends of coupling runs CR so carriers at ends are out of coupling reach until moved to coupling position for train. Carriers at left end of track STE are loaded for train. Carriers at right end are empty.

A car 24 moving left to right that side couples a carrier with container for the train moves the carrier along track STE, brings legs 184 under car 24, and the container over car 24 below loading height to offset position before inclines 32L lift the carrier with container up to clear latchdowns from catches. At this height displacement curves in track STE move the carrier in to alignment run to position pedestals 46E over pedestals 46 before slopes 32R which lowers the carrier to set the container on car 24 latching pedestals 46E to 46 as in my U.S. Pat. No. 3,677,194 and clearing the forks from the container before displacement curves carry the carrier out from under the car which uncouples along the coupling run at right.

A car 24 moving right to left having container 20E and coupling an empty carrier 16E would have the container lifted off by the carrier rising on inclines 32R to clear latch-downs over the catches on pedestals 46 and move off from over the pedestals to clear along the offset run, wherealong inclines 32L lower the carrier with container to grade before being carried out from the side of car 24.

The container 20E can likewise by transferred to truck trailer 26, FIGS. 14–18 moved along the transfer run in alignment from left to right or from the trailer when moved right to left along the run. Jack pedestals 48 can recess below the bed of trailer 26 so container 20E with pedestals 46E can bottom on the bed of the trailer.

The operation is substantially similar as for FIGS. 1–38 except for the added offset run which with the offset pedestals on both container and car enable the carrier track to cross rail or wheel track of the transport vehicle at level.

The trucks supporting one side of the carrier are preferably shiftable on pins 96 and centered by resilient material 194 between side plates 90 or 90E and shaft 98 or joint block 190 to compensate for variation of gage between rails of track STA or STE, See FIG. 47.

TWO TRUCKED CARRIER

Referring to FIGS. 49–57, at another station along track T, station track STF is provided with a transfer run for carrier 16F supported on two four-wheeled swivel trucks, 54FL under left end and 54FR under right end. Track STF (preferably standard gage) has three sets of displacement curves DC1, DC2 and DC3 corresponding to track STE from left to right. Track STF divides for each displacement for a separate run for truck 54FL and 54FR to make similar curves and inclines simultaneously, truck centers apart, to keep the carrier parallel with car 24 both horizontally and vertically throughout the transfer run. Starting from the coupling run CR at the left, track STF branches into identical curves DC1, carrier truck centers apart, for respectively truck 54FL and 54FR. The far rails of track STF cross the near rail of track T to offset run OR before rise 32L to lift the carrier until latchdowns clear over catches on pedestals 46. At this height track STF curves to alignment run AR positioning the carrier so pedestals 46E on container 20E thereon align pedestals 46 on car 24 before slope 32R down to grade followed by branching of track STF to curves DC3 out crossing near rail of track T on level before these curves realign and join in coupling run CR at right. The carrier is uncoupled from car 24 preferably along the coupling run following transfer by the coupling controls, FIG. 51, of my U.S. Pat. No. 3,483,829, or by track STF curving away from track T at the far end of the coupling run.

Track STF can be run to station platforms and away from track T beyond ends of the transfer run shown. The carriers can be pushed about on track STF or moved by rope haul along the near side of track STF or by a small locomotive using coupling bars with hooking pins on ends for coupling the carriers between eyes 198 of trucks and 54FR to move the carriers loaded or empty to position for transfer or storage.

Carrier 16F has an open frame 200 comprising forks 44L and 44R connected by a bar or rectangular tube 202 along one side. The forks are bent back under to form legs 184F each secured by a transverse pin 204 to a swivel knuckle 205 supported on the swivel pin 206 of a truck 54FL at the left or 54FR at the right. Additional forks 45 can be added from tubing 202 or extension thereof or forks 44L and 44R can be located apart from legs 184F to space for coupling with any of the transport vehicles disclosed thus far herein.

Trucks 54FL and 54FR each have a U-shaped frame 208 with axle 210 parallel through each leg with a small single-flanged railway type wheel 212 mounted on each end. Each truck has a low level plate 216 integral between legs of frame 208 for supporting knuckle 205 on central pin 206. Leg 184F extends into the open end of U-frame 208 to be within the height of the truck to extend under car 24E between its trucks with clearance for lifting along the transfer run. The trucks are the same except truck 54FL has flanges out and 54FR has flanges in to run on the same rails of track STF except at displacement curves where the forward truck is guided to take the forward displacement curves and the rear truck guided to take the rear displacement curves in track STF in either direction to guide the carrier parallel to and from the transport vehicle when moved therewith along a transfer run.

A carrier 16G for this station track has vertical forks 45V', FIG. 58, and end coupling forks 44L and 44R for coupling with car 24A. Preferably a bar 220 connects tops of forks 45V' with prongs 222 on top of bar 220 for engaging in pockets 152 on sides of containers 20E' to lift the container without engaging forks under the container. Wheels 154 along forks 45V' roll on the side of the container to eliminate scraping and hold the container from tilting.

Two opposite transfer runs (mirror image) can be connected unload end to unload end as in FIG. 59 along track T for both unloading and reloading cars passing the station track in either direction. This feature of reversely connecting transfer runs unloading end to unloading end preferably with additional trackage between is applicable to all the station tracks described herein. A truck transfer run can be substituted for the reverse railway run along any type of station track shown herein. Likewise the station tracks can have successive runs for truck transfer to unload and reload trucks from either direction. Points between these reversed runs can be connected by trackage to points between other pairs of transfer runs of the same type of trackage. Track T can be in pavement for use for either truck or train transfers with transfer rise 32L to 32R in track positioned so a truck can be driven along the transfer run straddling the transfer rise in the offset and alignment runs in the driveway.

PASSENGER TYPE CONTAINER

Referring to FIGS. 59–68 for a simplification for transfer of short containers 20WH or 20H between car 24H and station track STH. Containers 20WH have four flanged wheels 212 for engaging and supporting the container on track STH but containers 20H are each transferred by a carrier 16H having the four wheels 212 similarly positioned for running on track STH. STH is standard railway track having transfer runs similar to STF except branches on the displacement curves for separate front and rear trucks are omitted, since the container or carrier only has four wheels. Preferably two transfer runs are connected between coupling runs at unloading ends, see FIG. 59, to unload a container 20H or 20WH from car 24H and reload a container 20WH or 20H into the car passing the station in either direction. The ends of the station track beyond the alignment runs can be omitted if the wheels 212 stay with the container, and these ends shown in phantom for carriers 16H do not interfere with wheels 212 on containers 20WH. Wheels 212 on containers 20WH engage and disengage with track STH at low points of inclines 32L and 32R, since these inclines align under wheels 212 on container 20WH on car 24H.

Car 24H on truck T has a berth 230 along one side for container 20WH or 20H to be carried between the car's trucks. Berth 230 has an open bottom with a supporting ledge or recess 232 in a side of car 24H and a car sill 234, along the inner side of the berth on which the container is held by locating cones 108 on these ledges engaging in holes in the bottom of the container. Containers 20WH and 20H have a support tab 236 at each end of the outer side which has locating holes which fit over conical pins 108 on the floor of car 24H at ends of berth 230.

Containers 20WH or 20H for enclosed cars 24H for operation in passenger, express or mail service are enclosed with ends curved horizontally on the radius from the opposite outer wheel 212 as center to fit between mating curved-in end walls of partition 238 separating berth 230 along one side of car 24H from aisle 240 on the opposite side of the car. Sliding door 242 in partition 238 registers with a sliding door 244 in each container when in the berth for passage to and from train facilities. The curved ends of the containers are shaped as on gear teeth for the containers to turn on track STH out and in from the closely fitting berth with least waste space and to maintain streamlining of the car.

Container 20WH has its wheels 212 mounted one at each end of a leg 184H mounted transversely one on each end of a box-like frame 246 mounted on the bottom of the container to clear the bottom of car 24H and track T. Carrier 16H, FIGS. 66–68, for container 20H, FIG. 65, has box-like frame 246 on a leg 184H at each end with wheels 212 mounted for track STH and similarly positioned as on container 20WH. Locating cones 108 on top of carrier 16H engage in holes in the bottom of container 20H to secure them together for transfer. Container 20WH is the same as container 20H but with a carrier 16H secured thereto as part thereof.

Side coupling latches 52L and 52R are mounted at the left and right ends of berth 230 below the floor on car 24H to engage legs 184H therebetween to couple container 20WH or carrier 16H to car 24H for transfer of container 20WH or 20H on or off the car. An empty carrier 16H would be positioned on the coupling run at the near end of the station track for each car 24H calling for transfer of a container 20H—none for containers 20WH.

Starting from left of FIG. 59 with one rail of track STH further in than the center of track T and other rail outside of track T track STH runs up incline 32L along an alignment run AR to engage a container on car 24H with carrier 16H or with track STH the container to clear locators 108 of car 24H before track STH curves out slightly to an offset run OR parallel track T along which track STH slopes 32R back down before curves out at grade from track T to a coupling run CR and optionally a storage run between transfer runs. The transfer run at the right is the reverse of the run at the left and serves to load a container onto a car moving from left to right or for unloading a car from right to left. The arrows in FIG. 63 show the lifting and lowering movements provided by the station track to unload the container from the car. The reverse transfer run or movement of the car provides the reverse of these movements to lift a container before inserting all the way into the car to set the container on locators 108.

STATION TRACK HAVING TOP AND BOTTOM RAILS (IN FOLLOWING EXAMPLES)

Referring to FIGS. 69–74 for a first example of this invention using station track of the type known as bicycle track, train 12 having one or more enclosed passenger type container transfer cars 24I or which can be a self-propelled rail car on track T is shown transferring a container 20I to station track STI to make a stop along platform P wherefrom another container 20I is accelerated to be coupled and put into the spot vacated by the container removed, saving a stop for the train.

Car 24I has a partition 238I separating an open container berth 230I along one side wherefrom the roof and side are omitted to facilitate loading and unloading containers. Container 20I is enclosed with curved convex ends 252 and doors 244 in sides. Doors 244 on the side against partition 238I align sliding doors 242 in the partition along aisle 240I for passengers to move from the container to seats in the train. Berth 230I preferably has straight ends with a belt-over-roller bumper 256 along each end (roller axles vertical) against which the curved end of containers engage to eliminate scraping while being inserted and withdrawn. The container rests on the floor of car 24I which has two cut-away openings 258 from the side of car to receive two wheel brackets 260 on the bottom of the container. The container is held in position by locator buttons 108 or other suitable means (see my U.S. Pat. No. 3,677,194).

A latching coupling 52I at each end of berth 230I engages the container between these couplings to move it along track STI into berth 230I where it is set down on locators 108 when pushed off the end of the station track. Coupling latches 52I have channel 166I turned legs in mounted on vertical pin 70I mounted to slide along a track 264 against spring 266 in a recess in the side of car 24I. Bumpers 256 are each mounted to slide in and out on the car between the top and bottom parallel channels 270. The outer drum on each bumper 256 is roller 80 on shaft 82 between legs of channel 66I in the latching end of coupler 52I. The bumpers are each mounted between top and bottom channels 270 to slide in and out with the latch connected thereto on shaft 82. The inner ends of channels 270 for each bumper are connected on vertical pin 271 between brackets 272 to recess against spring 266 when the coupling latch attached couples a container. Cylinders 76I are each mounted along a channel 270 with a rod end connected to the bumper conveyor 256 to extend the attached coupling by controls described for side coupling.

Containers 20I have a horizontal wheel 274 at each end above the roof along the outer side and a wheel 86 in bracket 260 below each wheel 274 for running on station track STI. Top wheels 274 are mounted to rotate on vertical shaft 280 extending up from the top of the container one at each end of outer side. Bottom wheels 86 are double flanged and mounted on spherical bearing 282 on axle 88I between legs of U-bracket 260 to rotate substantially in a plane parallel the side of container and car to engage supporting rail 36 of track STI and follow curves therein. Rail 36 slopes up at 32L from its end to lift the container off the car floor and curves out below paralleling upper channel rail 284 turned legs down and flaired out at ends to receive wheels 274 therein and supported depending from bracket arms 286 to columns 288 embedded in footings along the far side of track STI from track T to brace the container in substantially vertical position as it is moved along the station track.

Track STI curves back parallel track T at a distance for clearance to free the container from between coupling latches 52I where it is retarded by rope haul or conveyor 290 or other means to stop along platform P. The preceeding container 20I, reloaded and ready for a train, is moved from platform P along track STI curved in closer to track T to coupling run CR wherealong the container is positioned and accelerated by rope haul 292 to safe coupling speed for side coupling the car 24I with extended coupling latches 52I. Beyond the coupling run, track STI curves in closer to alignment run AR along track I to insert the container and therebeyond bottom rail 36I slopes down at 32L to set the container in car 24I passing beyond the end of track STI.

Rope hauls 290 and 292 are preferably above the container to be out of reach and protected from ice, snow and weather by roof 296. They each have a rope 298 over shelves or pulleys 300 supported from roof framing to engage the top of containers with neoprene covered, pusher logs or lugs 302 on the ropes to engage and retard or accelerate the containers. The rope hauls are controlled as in my Pat. application Ser. No. 405,825, FIGS. 8 and 15, except the retarder 290 is above and engages the top of the containers to retard and move them. Optional inflatable tubing will be described to replace these conveyors (see FIGS. 93-94 with description later herein).

For two directional operation on track T a station track STI is provided along each side of track T if cars 24I are turned around at ends of runs or if not, a coupling run CR is provided beyond each end of platform P so containers therealong are at correct distance from the side of car 24I to couple. Rope hauls 290 and 292 would then be similar, reversable, and controlled to accelerate as well as retard containers 20I according to direction of the train.

Retractable Wheels On The Container

Top wheels 274 and bottom wheels 86 are preferably retractably mounted on containers to increase clearance except where extended for transfer and to make transfer selective to skip stations where transfer is not needed and to select one of a number of containers in a train for a particular station. One way to do this (FIGS. 75-77) is to mount wheel frames 260 on a shaft 306 between tabs 308 depending from the bottom of a container to fold frames 260 in under the container as shown in FIGS. 75 and 76. A spur gear segment 310 is welded to the inner top corner of a frame 260 concentric on shaft 306 and engaged with rack 312 on the end of solenoid 314 mounted in container 20I below the floor. Both frames 260 are secured on the one shaft 306 so one solenoid 314 lifts and lowers both wheels 86 together. Top wheels 274 are each axially secured to turn on a shaft 280 run down through a hole in the bottom of a container, and each has a gear rack 318 engaging a spur gear 310 secured on shaft 306 to lift wheels 274 when wheels 86 are lowered. Spring 322 biases frames 260 to lift, retracting wheels 86 and 274. Solenoid 314 is energized to extend the wheels just ahead of track STI when desired to transfer the container.

Referring to FIG. 77, solenoid 314 is energized by a circuit from the positive of battery 326 on the car, normally open contacts of cam switch 328 closed when engaged by a rail 330 along where the station track rail starts, contact plug and receptacle 332 to the container on the car, bottom front contacts of memory relay 334, solenoid 314 to ground of battery 326. Relay 334 is lifted to transfer by circuit from receptacle 332, normally closed reset limit switch 336 opened by extension of solenoid 314 when energized, closed-door interlock contacts 338, line 339, push button 340, top coil of relay 334 to ground, closing a holding circuit from line 339, top front contacts and bottom coil of relay 334 to ground. By pushing button 340, relay 334 is lifted when safe for transfer (doors locked closed) to energize solenoid 314 to extend wheels 86 and 274 just before the container reaches track STI which thereupon lifts the container from the car for removal to the station. The wheels are locked extended by a solenoid latch or pin 344 engaging in a hole in rack 312. The pin is lifted by circuit from positive of battery 326, normally closed contacts of cam switch 328 when dropped at the end of rail 330 after the transfer run, plug and receptacle 346 to container, solenoid 344 to ground. Side coupling valve 84 is energized to extend coupling latches by a circuit from the positive of battery 326, normally open contacts of cam switch 328, limit switch 348 opened by a container fully in berth, solenoid of valve 84 to ground, to extend side couplings whenever a container is removed from the berth along a transfer run so an advance container at the station can be side coupled and moved into the spot vacated by the container just pushed out on the station track.

Container For Transfer On Double Displacement Track

Referring to FIGS. 78–81 for a variation of the station track and container wheel mounts so that the container 20J of FIG. 78 is carried in and out from car 24I parallel thereto so container 20J can have rectangular ends that fit closely into berth 230I on car 24I. Station track STJ has double displacement curves 30 in bottom rails 36, 36L and 36R (similar to the station track of FIG. 1) and only one top channel rail 284 centered between the lower displacement curves 30 of each displacement and elsewhere run nearly directly above rail 36. Container 20J has a single horizontal wheel 274 at the top above the outerfacing side to run in channel 284, a truck 54JLR at the left end with two three-grooved wheels 93, and a similar truck 54J at the right end with two single grooved wheels 86.

Rail 36R starts at the left along track T, runs up slope 32R to lift truck 54JLR only and curves away from track T while rail 36, truck centers beyond runs up a similar slope 32 for lifting truck 54J only and then curves away from track T with a similar S-curve as in rail 36R to lift and remove the container with trucks lowered from car 24I. Rail 36R extends to realign along right side of and flange clearance above rail 36 (viewed from left) and slopes down to end. Rail 36 runs by platform P carrying both trucks before rail 36L rises along side at the left to lift wheels 93 over rail 36 to curve in to coupling run CR truck centers distance before rail 36 makes the same curves. On a long coupling run rail 36L would run down and end after rail 36 curves along beside at a flange clearance below, and rail 36 would again support both trucks for this run. After which rail 36L would again start up to lift truck 54JLR over rail 36 and S-curve to alignment run AR truck centers ahead of rail 36 following a similar curve before both rails slope down at truck centers apart to end to set the container into car 24I.

Trucks 54J and 54JLR can be similar to trucks 54 and 54LR respectively or as shown designed to be lifted and lowered for selective transfer. They have two side plates 90 connected by transverse pin 94 through round tubular knuckle 350 which slides up and down in round tubing 352 mounted vertical to turn on the bottom of the container concentrically. Knuckle 350 has a threaded vertical hole central from the top into which the bottom of a vertical shaft 98J is threaded, connected by gearing 356 and shafting 358 between the trucks, and turned by battery operated gearmotor 360 or other means to lift and lower the trucks together. Wheel 274 is mounted to turn on the top of vertical shaft 280J, which is square below wheel 274 to slide up and down in a square hole in the roof of the container 20J. Shaft 280J has a threaded hole from bottom into which the threaded end of a shaft 364 turns to lift and lower shaft 280J. Shaft 364 is connected to gearing 356 and shafting 358 to lift and lower wheel 274 as the trucks are lowered and raised respectively to engage wheel 274 between top rails 284 to brace the container from tipping when trucks engage bottom rails, to lift and move container 20J out from car 24I and vice versa along track STJ. A vertical coil spring 366 connects the bottom of container 20J with each end of each truck to resiliently position the trucks parallel the container to reengage track STJ.

Containers 20J of car width, FIG. 82, can also run on track STJ which is therefore extended away from track T to a distance (preferably a run) to coupling distance for containers 20J', further from track T than the coupling run for containers 20J and therebeyond so track STJ can handle different widths of containers. Car 24IF has aisle 240I omitted to receive container 20J'.

Monorail

The transfer car and tracks are generally equally applicable to use with monorail or a wide gage suspended track T' as shown by modification of the railway car and track, FIG. 83, where car 24I' on widegage suspended track T' of good stability from sway is equally applicable in my transfer system.

Front To Side Transfer

A variation in which the containers are received at the front of a train and removed from the side is shown in FIGS. 84–92 where trains 12K have container transfer cars 24K or 24K' and optionally other type cars running from left to right on track T past station platform PK served by station track STK so these trains can run nonstop at close headway and yet provide local service to the station with containers 20K. The station is typical of stations along track T for trains 12K. Platform PK is located between tracks T and STK to serve trains that stop thereat or can be located as shown in FIGS. 85–87 and 92 to serve only the containers that are selectively carried out of the train and to the platform along the station track.

Station track STK is the same type as STI but of a different station plan for front end loading of containers 20K into train 12K. Track STK has lower rail 36 on which run double-flanged wheels 86 and upper angle or channel rail 284 in which runs wheels 274 on the containers 20K. The lower rail 36 starts at the left on ends of ties of track T and is inclined up to lift containers which have wheels 86 positioned to engage with the rail only if ready to be removed from the car, i.e. when doors to the containers are locked closed. Top channel rail 284 starts above rail 36 and runs along directly above rail 36 to receive wheels 274 on top of containers whose wheels 86 are lowered to lift the container from the car passing incline 32 in rail 36 from left. The container is held vertical by leaning against partition 238K along car 24K or 24K' until after wheels 274 engage in channel 284 to support the container substantially upright but with desired tilt on curves. Rail 284 is turned legs down and suspended from arms 286 secured on top of columns 288 embedded in footings in the ground. Track STK curves out to platform PK and beyond curves back along track T for a coupling and alignment run ACR for the car at the head of the train to catch up a container accelerated ahead of the train. Track STK can be continuous between closely spaced stations. The lift off run can be shorter than the coupling-alignment run, but for two directional operation on single track, track STK is lengthened to coupling run length at each end. If some or all of the cars are turned around on the return run a station track can be provided on each side of track T and this can be along a passing siding.

Cars 24K and 24K' are self-propelled, connected through end doors, and have partition 238K separating a container area 368 from a center aisle 240K therealong running from front of car 24K for a plurality of container lengths or for the length of the car 24K'. The cars are enclosed except for this berth area which has a belt under roller conveyor 370 along the bottom of the berths in from the sides of the containers thereon so trucks or wheel brackets 260K can extend down along and below the side of car 24K to engage the station track. Car 24K is full width behind the container area. Partition 238K has sliding doors 242 spaced to align container doors 244 for access to containers 20K when held aligned at the doors.

The containers shown each have an enclosed body with convex ends 252 and doors 244 for passengers, baggage, freight, express or mail and optionally have wall mounted folding seats 376. The containers have a top horizontal wheel 274 and a bottom vertical wheel 86 at each end on the side which faces out when the container is on a car. Wheels 274 are each mounted to turn on a shaft 280 secured extending up from the roof of the container. Wheels 86 are each mounted on a shaft 88 between side plates of truck frame 260K connected above and mounted on transverse pin 378 between sides of brackets 379 on the bottom of the container to swing up in a plane along the side of car 24K, FIG. 86. Frames 260K each have an integral worm-gear segment 380 concentric with shaft 378 and each engaged with a worm 384 oppositely turned and secured on shaft 386 bearing mounted under the floor of the container parallel its sides and driven by gearmotor 360 to lift and lower wheels 86. The worm and gear holds wheels 86 in lifted or lowered position.

The containers are passed along train 12K', FIG. 90, on roller conveyors 370 of car length to spread the container transfer service along the train to stop at rear car 24K or 24K'. Preferably telescoping (accordian) conveyor bridge sections 370B support the containers between cars. The containers are kept from falling off conveyors 370 and 370B by a curb 390 on the bottom of each container along the side facing partition 238K to guide on the side of conveyor channel, FIG. 91. Containers are held aligning doors 244 by latches 392 pushed out at each berth to engage in slot in the bottom and side of curb 390. The cars can be wider on the side for the containers if desired to better balance the car and provide wide support for the containers. Since the containers are spread along length of the car and the number used for transfer can be varied according to load, the containers are narrow enough to provide room for seating 394 along the length of cars 24K'. Conveyor 370 is only run while the car is passing a station track and for a short time beyond by its motor 398 being connected through time delayed opening relay in place of solenoid valve 84, FIG. 7, to run the conveyor slowly front to rear. The station has a decelerating conveyor 290 and an accelerating rope haul or conveyor 292 as in FIGS. 69, 71, 78 and 79 to stop the container removed from the car at the platform and to accelerate a container therefrom ahead of the train to move its conveyor 370 under the container before the end of track STK.

Optionally the conveyors 370 for moving the containers along the cars and conveyors 290 and 292 at the stations can be made of wide flat tubing 404 of two flat strips of rubber sealed together along the edges and supported to engage flat against the bottom (or top) of containers so air connot leak past. Containers 20K for movement thereon have ends of their bottom curved up and coated with sheet teflon or other low friction material 410 or straight rollers 412, FIGS. 92-93, are mounted at ends of the bottom to press tubing 404 flat closed to prevent air flow in the tube past the container. Using an inflated tube 404 in place of roller conveyor 290 cushions the container coming onto the train to accelerate to train speed and separates containers on the car with air. For this air reservor AIR is connected at the front of a bag 404 to push the container to the rear where air leaks out excess pressure relief or solenoid exhaust valve 414 opened by a circuit from positive of battery 326, normally open contacts of limit switches 416 in parallel positioned along under the tube to be closed by the weight of the container thereon, solenoid of valve 414 to ground, to open to relieve pressure at the rear of the container so pressure at the front can push the container back along the car until latched at partition doors selected by the operator setting a latch 392 or until the container bumps stop 390. Any containers on the cars are preferably unlatched for the time when containers enter the train, so they will move back for incoming containers.

At the station FIG. 84, conveyor 290 is a tube 404 run from where containers leave cars to the station platform and connected to air tank AIR' (app. 20#) at the entrance end and connected at exit through pressure relief valves 420, 421, and solenoid valve 422 for example at respectively 50, 35 and zero # pressure. Valve 422 is opened to dump after a time delay for the container leaving the station to clear, so the container removal from the train is moved to platform PK by pressure at the entrance end of the tube of conveyor 290. Conveyor 292 has a tube 404 run from the end of the tube of conveyor 290 to the end of the accelerating run where track STK curves to the alignment run and is pressured from the entrance end gradually to the same pressure as conveyor 290 to accelerate the container to reach a safe speed to be taken on train 12K.

A car axle D. C. generator DYNL which develops voltage representing car speed, is connected between shoe 424 and ground on lead car 24K or 24K'. Shoe 424 engages rail 426 run along track T from a few hundred feet ahead of track STK to end thereof and engages a short rail 428 about a hundred feet after the start of rail 426. A start timer 430 as in my patent 3,483,829, FIG. 28, has its drum motor connected between rail 426 and ground to run at a speed substantially proportional to train speed and a recording head connected between rail 428 and ground to record arrival of the first car in the train at the station. The pickup head for the recording head receives the recorded signal after a delay approximately inversely proportional to train speed. This head is connected through an amplifier to lift stick relay 438 which is held by a circuit from rail 426, top front contacts and bottom coil of relay 438 to ground return to the train. Relay 438 closes circuits from the positive of battery 440, bottom front contacts of relay 438, motor for air compressor 442 (connected to entrance end of tube 404), to ground in parallel with timing motor TM for rheostat 444. An air motor 446 is connected to the outlet end of the tube of conveyor 292 to drive a D.C. dynamo DYN2 and a motor-break 448 for controlling exhausting of the tube, controlling acceleration of the container along the tube. The resistance wire of rheostat 444 is connected from rail 426 to ground and its wiper turned counterclockwise by motor TM from stop at ground to increase voltage while contacting segment 450 is connected to dynamo DYN2 through controls ACC (as in my U.S. Pats. No. 3,037,462 and 3,483,829) to accelerate or retard the exhaust of air from the tube to accelerate the container from platform PK, substantially independent of load, up to loading speed difference just ahead of the train. When rheostat 444 is turned to full voltage against a stop at the top its finger cuts out all the resistance and connects rail 426 to the solenoid of valve 422 to exhaust the exit end of the tube of conveyor 290 so the container just removed from train will be moved by pressure from AIR off of that tube onto the next tube, conveyor 292, when exhausted when shoe 424 leaves rail 426.

Cantilever Container Carrier

Where cargo containers are to be transferred by cantiliever suspension these containers can have transfer wheels and these wheels and mounts therefore can be removeable for shipment of flatbed trailers and trucks and for ship and air travel, but, referring to FIGS. 95-123 it is better these wheels and mounts be mounted on a vertical carrier frame for running on the station truck and side hooks and eyes be provided on the frame and containers to hook the containers along side on the carrier to lift the containers off or set on railway cars and conveyors by providing a dip in the station track and side couplings for moving the carrier with the railway car. The containers can be removed from the carriers at the station by a station track dip setting the containers on a conveyor or by side loading or fork lift vehicles to take to unload-load or storage area or transfer trucks, boats aircraft etc. Side hooking is preferred to fork lift since the load can be set on floor or ground without blocking or pedestals being needed for the containers.

Accordingly train 12'FIG. 95, traveling left to right on track T, includes one or more container flat cars 24L', for one 40 foot or two 20 foot cargo containers 20 or 20E' respectively. Either or both container spots can be loaded or unloaded simultaneously as each car 24L passes station track STL having container carriers 16L with side couplings 462 which engage between latches 52L' on the side of cars 24L when in alignment for a transfer run.

The station track, of similar construction as track ST, has top bracing channel or angle rails 284 superposed over a bottom supporting rail 36 and run parallel to track T except for transfer displacement curves which guide the carrier against the car and dip slopes 32 along where carriers are against the car dn lowers to release containers to the car and raises to lift off only containers having open or extended hook pockets 152L FIG. 106, engaged by carrier hooks 466 and thereafter curves back out to coupling distance from track T so carriers on this track can transfer containers with trains from either direction. The transfer run can be simplified for one direction only by providing a half dip, slope 32 up or down only, as taught with FIGS. 2 and 28.

The carrier 16L has a vertical rectangular frame 468 of two end columns 470 connected by a vertical truss 472 supporting container hooks, hook pins 466, along one or both sides and having wheels 154 mounted at top and bottom under each pin 466 to roll in vertical channels 182 in sides of containers to prevent scraing and hold the bottom of the container out substantially level. A two-wheeled swivel truck 54 secured under each column 470 on spring 99 supports each end on rail 36 of the station track, and a wheel 274 mounted to turn on vertical pin 280L on top each column 470 is engaged in the channel of rail 284 to brace the carrier with the cantilevered container upright.

The carrier 16L has a side couping 462 comprising two shock-absorbing coupling cylinders 482 each pivotally secured on a pin 483 at the head end to opposite ends of frame 472 and both connected together at the rod end by a vertical pin 486 through offset clevis 488 FIGS. 103-105, on each rod straddling roller 489 on the pin. The rods of cylinders 482 are each extended by air or preferably a light coil spring 490 inside the cylinder so wheel 489 will engage between spring extended latches 52'L on the side of car 24L and recess the rod easily as the carrier moves against the side of the car along the transfer run. The clevises or outer ends of rods of cylinders 482 are bent out to pin 486 so as not to interfere with latching even when the carrier recesses the coupling cylinders as in FIG. 99.

Each coupling latch 52L' FIG. 103, on car 24L has a hollow head cap 494 secured to telescope over two parallel bars 496 or a heavy square tube pivotally secured on vertical pin 130L mounted to rotate in frame of car 24L to extend out and in along side. A pin 498 through bars 496 extends into slot 500 on the top and bottom bars 496 to retain cap 494 held extended by coil spring 502 pocketed in cap 494 and against pin 498. Each pin 130L has a gear segment 504 secured thereon each engaged by an oppositely turned worm 506 keyed on shaft 508 to slide against springs 510 against collars 512 on shaft 508. Shaft 508 is driven by a permanent-magnet gearmotor 514 to extend coupling latches 52L' by a circuit FIG. 97, from the positive of battery 326, normally open contacts of reservation relay LU which represents relays L1', L2', U1', and U2' in parallel as in FIG. 39 of my U.S. Pat. No. 3,956,994 or relays L and U of FIG. 21 of my U.S. Pat. No. 3,483,829, normally-open top contacts of cam switch 516 closed by rail 518 along the transfer run, armature of motor 514, limit switch 520 opened when coupling latches 52L' are fully extended, normally-open bottom contacts of cam switch 516 to ground of battery 326 to extend the coupling latches. Motor 514 is reversed by cam switch 516 dropping at the end of the transfer run closing a circuit from the positive of battery 326, normally closed contacts of cam switch 516, normally closed limit switch 522 opened when latches are retracted, armature of motor 514, normally closed bottom contacts of cam switch 516 to ground to retract the latches only after the transfer run is completed. Springs 510 let latches 52L' partially retract to latch and so carrier can move against the car as in FIG. 99. Worms 506 prevent other retraction of the latches except when turned by motor 514 to prevent uncoupling during transfer.

Any of the coupler latches herein could be extended by worm and rack drive in place of an air cylinder to prevent opening if air pressure is lost during transfer. This drive is shown in FIG. 105 applied to two facing latches 52' pivotally mounted on pins 130' either in a resiliently mounted frame or secured directly to the frame of the car. Each latch 52' has a rod 524 pivotally secured on the back of the latching end and extending back through a hole, one in each end of a yoke bar 526, with springs 528 around the rods one on each between the latch and the bar to extend the latch out to where a retaining ring on the end of rod 524 engages back of the bar. The yoke bar is secured central on the end of a gear rack 530 guided to slide transversely on the car and driven by worm 506' on the shaft of motor 514 to extend and retract the latches to and from coupling position.

These couplers are preferably each mounted in a frame 68L mounted on pin 70 to swing against springs 74 into an opening in the side of the frame of car 24L to recess the coupling latch under too great a load as would occure if a side coupled carrier hits another carrier at the end of a transfer run. Track STL curves away from track T to uncouple carriers from cars at the end of the transfer run. The coupling controls are as in FIG. 51 of my U.S. Pat. No. 3,483,829.

Container locators FIG. 102, are of cylindrical base (or inverted coincal section) topped by a locating cone and spaced to align straight holes in the bottom of the container. The locator's base enters these holes to prevent the container climbing the cones.

Containers 20 and 20' have top, bottom and sides and ends with two or more recessed vertical channels 182 turned legs out in each side top to bottom and an eye or pocket 152L extending out at the top in each channel 534 to each receive a hook pin 466 on carrier 16L for suspending the container along the side.

Transfer is made selective by making the hook pockets or eyes retractable so only containers ready for transfer extend pockets or eyes for removal from the car or station. Hook pockets 152L, FIG. 106, are in the form of an angle turned one leg down and one in. Each pocket 152L is keyed on a shaft 535 parallel through the middle of the top leg of the angle pocket across the back of channels 182 along each side of the container so the bottom leg of the pocket can swing out to ends of the legs of channel 182 or slightly beyond to be engaged or swing down against the trough of the channel to be recessed to miss or deflect a hooking pin moved up the channel. The longer leg is turned in and engages a recess in the top of the container to support the load and extends above the container when the angle is recessed in the channel so load-spreader frame 536 of station gantry G, FIGS. 111-113, will open the pockets when engaged in corner castings 540 in the top of the container for lifting the container from a storage spot and moving it to hook onto the side of carrier 16L, FIG. 111.

Each container is routed by a punch card or equal to control the lifting eyes or pockets on the container to be extended at the station for transfer. A spring returned solenoid 544 is pivotally connected between an arm 546 secured on shaft 535 and vertical framing in the side of the container to turn shaft 535 to normally hold the pockets retracted. Solenoid 544 is energized by a circuit from the positive of battery 326 on the car or at the station, plug and receptical 332 to the container on a car or station storage spot, routing-card reader 548 as in my U.S. Pat. No. 3,483,829, FIGS. 18-21, which completes a circuit through a punched hole in the routing card when the container is to be transferred, solenoid 544 to ground of battery 326 to extend pockets 152L so pins 466 can engage for transfer when reader 548 reads (dwells on) a hole in the routing card for the station the train is entering.

FREIGHT STORAGE STATION

A preferred type of station for interchange between railroads, trucks and storage etc. is in the form of a loop 550, FIG. 107, with one side run along railway T for two successive transfer runs TR each curving in along the railroad from opposite ends at low level for a carrier to position under a container on a train and lifting on slopes 32 before curving out at the higher level to join for unloading on the first run and loading on second run a train from either direction to utilize emptied cars for reloading and to simplify carrier loading. The opposite side of loop 550 is run along a carrier unloading-reloading area where containers are lifted off the carriers by fork trucks 552 or equal to set on track beds 26, FIGS. 14-15, or on storage pedestals. The carriers are loaded and can be unloaded by lift truck 554 having a load spreader 536 for engaging in corner castings on the container and which presses down on top of rockets 152L to extend them to engage on hook pins 466 on the side of the carrier. The carriers are moved around on track STL by tractor 556 or can be self-propelled and controlled as in FIGS. 36-38 of my U.S. Pat. No. 3,483,829 to be lined up for successive side coupling with cars 24L which are reserved for transfer as per FIGS. 26, 29, and 31-32 of that patent. Track STL has sidings STS for storing empty carriers and carriers with loads prearranged for trains which have signaled their loading requirements in advance to the station as in FIGS. 27, 33 and 36 of that patent for loading each carrier as required by the car which completes reservation circuits as described with FIGS. 26 and 29-32 of that patent.

The cargo handling station need not be in form of a loop or loops but can be as in FIG. 108 with two successive transfer runs TR connected high ends together as described for FIG. 107 for unloading with the first run TR and loading with the second run in either direction. Switches 556 and curves 558 in track STL are added between the transfer runs to bring the carriers to interface with gantry G on track GT run at right angles to track STL. Empty carriers are stored at far ends of the transfer runs.

Referring to FIG. 109 for switch 556 in overhead channel rail 284 of the station track STL, switch 556 has a straight tung plate 560 secured on vertical pin 562 to guide wheels 274 to the same track as wheels on trucks below take. Pin 562 is connected to be turned by rotary and lifting solenoids 564 which lift and turn plate 560 from recesses 566 at each end of travel to hold in each switch position. Plate 560 is preferably electrically interlocked to change and signal its position to correspond with the position of the ground switch thereunder. The lower switch is standard for double-flanged wheels.

CARRIER FOR MOLE GENERAL TRANSFER
For More General Transfer

Referring to FIG. 110, carrier 16L' for one container 20 has forks 44L replacing side coupling cylinders 482 to have a clear bottom for setting the container down. Forks 44L have inlatching latches 570 on the ends spaced to latch and straddle the container above latches 52 which are mounted on car 24' to latch only a container therebetween, since an empty carrier need not engage an empty car or trailer. With this carrier a container or vehicle with wheels can be lifted from or set on a track, guideway or road or if without wheels for transfer to or from a conveyor or guideway that supports the container or vehicle for travel. Track STL should have small displacement angles so the forks can engage containers at that slant.

With this type of carrier the station of FIG. 107 can have two transfer runs TR to and from a roller or belt conveyor 572 along the storage side as shown and a transfer slope 32 in track STL between the displacement curves of each run on that side to the lower level between these runs, to set down and release containers along the first run and couple, move and lift off another container from the conveyor as the carrier is moved along the next run in either direction. These transfer runs TR in track STL are the same but reversely positioned, graded, and connected from those along the transport way T, since the carrier is the transport vehicle relative to this conveyor. The carriers and conveyors can move in either direction.

With this carrier the car and track T can be replaced by a belt conveyor 572 or other way for moving the containers. Empty carriers 16L' are moved into coupling position for selective coupling of containers for transfer off the conveyor. An operator or electric eye can see when to release a one-way latch stop 574 to let gravity move the carrier with a container down a slope in track STL and over the conveyor and set it down in an empty spot thereon.

Gantry at Station

Referring to FIGS. 111–113 for details of the gantry G, its load spreader 536 has depending channel 576 secured on each end to slide in 578, a vertical channel faced legs in on top of a wheel base channel 580 on each end of the frame of the gantry. Two double-flanged wheels 582 are bearing and spring mounted in each channel 580 to support the gantry on track GT. Wheels 582 are driven by gearmotor GM in a usual manner to run on track GT. A large rectangular tube-beam 584 connects end framing of the gantry at clearance above containers in the storage area. A vertically supported threaded shaft 586 in each channel 578 extends through a low friction bearing nut 588 secured at the top end of square tubing or channel 576 which slides up and down in channel 578. Shafts 586 are connected by gearing 590 and shafting 592 driven from gearmotor HM to lift and lower frame 536 so containers can be carried over top of containers in storage. The station can be served by a plurality of gantries on parallel runways.

The lifting of pockets 152L on containers at the station signals the gantry operator that these containers are to be loaded on carriers in spots which signal for loading as by lighting a lamp on the carrier, lamp 238 on each carrier in FIG. 36 of my U.S. Pat. No. 3,483,829. The load spreader on the gantry (or lift truck) holds the hook pockets extended when engaged with the top of container 2C etc. so the pockets can be hooked on side hook pins 466 of the carrier 16L.

Multiple Selective Small Container Side Transfer

Referring to FIGS. 114–119, passenger car 24M has a row of container berths 230M along each side separated by an aisle 240M enclosed with a roof 600 and partitions 238M with door 242 to each container berth. The car is preferably further enclosed by the roof extending out over the container berths at a space above so the container can be lifted when inserted and withdrawn. The containers 20M complete the car sides extending up along the outside of the roof to seal from weather. The car can have partitions 602 separating berths 230M for added strength and to secure the roof down. A vestibule 604 is provided with end doors for movement to other cars and side doors for boarding and leaving at stops. Train facilities can be provided on the car beyond the container area. The car has containers 20M' with seats etc. for passenger use enroute and containers 20M without seats for transfer only or for baggage, mail or express. The mail can be sorted by bag fulls enroute preferably in a car for mail only. Likewise express or freight and baggage can be sorted enroute. Each station need only serve one side of car 24M and alternate stations serve opposite sides, but large stations can serve both sides using transfer runs on both sides of track T. The car is preferably run only with a full set of containers between stations by putting a container back in each berth a container is withdrawn from even if the container is empty, thus maintaining better streamlining of the car and eliminating dirt, snow, ice and rain from accumulating in empty container spots and to balance car loading sidewise. For handling mail, express, etc. containers can be bins 20MΔ FIG. 119, and the partition 238M can be omitted and the transfers made under a shed 610.

Carrier 16M for these containers has a frame 612 as long as the container area along side on car 24M. Frame 612 provides both vertical and horizontal trussing and is supported on a swivel truck 54 at right and 54LR at left end. These trucks are as described with FIGS. 8-10 and parts so labled. Frame 612 has a vertical column 100M at each end into which the truck column 98 extends to rotate and rest on spring 99. Frame 612 has a top horizontal beam 220M with upstanding pins 222 serving as hook teeth spaced along to engage in retractable eyes 152M extended from the side of container 20M and a lower foot beam 616 parallel thereunder to hold the container upright when hooked to the carrier. Side coupler forks 44M extend from frame 612 to engage with latch couplings 52M on top corners above roof of car 24M. Couplers 52M are as in FIGS. 45–47 of my U.S. Pat. No. 3,956,994, but turned on their side to latch horizontally.

It is important that this carrier move against the car with parallel movement (no turning); therefore the wheels on each end of the carrier are arranged to move on separate displacement rails 36 or 36L and 36R to be displaced in and out and up and down simultaneously so containers will slide closely to and from position on car 24M without twisting or jamming. Horizontal wheels 274 one on top of each end are mounted thus: the wheel at the left in and the wheel at the right out on bracket 618 beyond wheel 274 at the left a distance so separate channels 284 for wheels 274 need not cross but run adjacent at the right side of FIGS. 114 and 116 at an angle of a few degrees but displaced at a greater angle at the left end of the transfer run, FIG. 114. The station track can have a desired configuration such as a loop, and, since the coupling forks 44M are above the containers, the carriers can set the containers on conveyors or traveling platforms. The containers are hooked on the carrier in positions signaling for loading to register with empty berths in the car to be side coupled as train moves by. The carrier can be loaded by a fork lift truck or with spacing and lifting conveyors as in FIG. 41 of my U.S. Pat. No. 3,484,002.

Each container 20 M has two lift eyes 152M spaced and secured near the top of the outfacing the side to recess into side of the container or extend out horizontal to align hooks 222 which engage in the eyes by a transfer dip TD in the station track STM to set containers on and lift off only containers having eyes extended. Eyes 152M are secured on shaft 535M, FIG. 122, secured in bearing mounts secured along inside of the side of the container to extend from and retract together into the socket flush with the side. A gear segment 620 is secured concentric on shaft 535M and engaged with a rack 622 lifted by spring 624 to retract eyes 152M and forced down by solenoid 544M to extend the eyes. Eyes 152M are (bellcrank) class 1 right-angle levers which, when the eye-end extends out, the inner end extends down behind the reinforced side of the container to stop the eye from swinging up beyond horizontal to support the container.

Solenoid 544M is controlled by a circuit from the positive of battery 326, door interlock 626 for passenger containers, normally open contacts of removal button 628 for passenger or goods and mail containers or where attendant rides the car, in parallel with ticket reader 548 for freight and passenger containers, normally closed contacts of limit switch 630 closed by latch 632 when disengaged from a pocket 634 in track 635 on a side of gear rack 622, FIG. 123, to lock eyes 152M extended, solenoid 544M to ground of battery 326 to force the gear rack down to extend eyes 152M for engagement by a carrier for removal of that container. A solenoid 636 release latch 632 to drop extended eyes. Solenoid 636 is controlled by a circuit from the positive of battery 326, normally open pushbutton 638, limit switch 640 opened by the carrier when side coupled to prevent dropping the eye after transfer has started, solenoid 636 to ground, to retract latch 632 from dent 634 so spring 624 will lift rack 622 to retract the eyes. The ticket or route reader is as in FIGS. 18-21 of my U.S. Pat No. 3,483,829 or FIGS. 101 and 102 of my U.S. Pat. No. 3,956,994 so that persons or freight can be transferred from the train by a ticket rather than by attendant or passenger pressing button 628; in which case the buttons and solenoid 636 would be omitted or locked out.

Application to Subways

Referring to FIGS. 124-134 for an application of this transfer system to a subway, FIG. 124, having two tracks T1 and T2 with trains 12S thereon including regular passenger cars 644, preferably every-other car is a transfer car 24S having a container area 646 on each side of the car. Each area 646 is of two container lengths for transfer containers 20S. The container a double wall partition 238S along the middle with sliding doors 242 therein to align container doors 244, a sliding door 648 of half the car width at each end of berth area 646 and mounted in transverse track 649 to close off either side of the car for containers so the opposite side becomes aisle 646. The floor of each berth area is a belt conveyor 370S over rollers or plates suitable to use as an aisle when the conveyor is stationary. A rolling roof and side of interfitting longitudinal corrugated panels or strips 650 as used for roll-up truck doors is driven by motor 652 through shafting 654 and sprockets 656 mounted above partition 238S to enclose either side to be the aisle while the opposite side is open for container transfer. These subway cars therefore need not turn around at a stub end of the line as shown at the right end of FIG. 124 but are cleared of containers before the end of the line and reversed at the end of the line by sliding doors 648 and shielding 650 to the opposite side of the car and latching them secure. Ends of enclosure panels 650 have wheels or guide blocks which run in a track channel 660 in each end of the car facing the container berth area. This track is along side a trough 662 in the roof across each end of the berth area. This trough is to receive coupling forks on the carrier. Cars 24S have a coupling latch 54S facing out at each end of each trough to couple a carrier on either side.

The containers 20S are closed curved ends just less than half of car width so the outer the side is flush with side of the car when inner the side is against partition 238S. Doors 244 in side of the container facing in align doors 242 in partition 238S at each bert of the container area. Hook eyes 152S, one at each end at the top on the side facing out, are aligned and secured on a shaft 535S to be engaged by hook pins 222 on carrier 16S and to swing down to clear from under the hooks and are counterweighted to swing out horizontal to be engaged by hooks 222 to suspend the container from the side. The containers preferably have a rubber band 668 run over double flanged rollers 670 at each end to prevent scraping while being inserted and withdrawn from the car (see FIG. 128). Bumper 668 can replace bumper 256 in FIG. 73.

Along and around the outside of tracks T1 and T2 is run station track SST with carriers 16S thereon for transfer of containers along the outer sides of the subway so the containers are brought closer to sidewalks than if between the subway tracks. Optionally the carriers could run between the subway tracks and preferably turned on turntables at ends of line rather than having hooks and couplers on both sides. The station track has a transfer run TR between each station. The transfer run includes an accelerating and coupling run AR followed by a transfer displacement TD preferably with safety bypass SB followed by an uncoupling and decelerating run DR to the next station. Track SST has a lower rail 36 and an upper channel rail 284 thereover for vertical framed carriers 16S that suspends the containers along its side.

Each carrier 16S has two vertical columns 100S connected by horizontal parallel rectangular tubular beams 220S and 616 near respectively the top and bottom with bracing to form a vertical frame 612S. A coupling fork 44S extends from a side at the top 1. of frame 612S to straddle the container area on the cars to engage between latches 52S and enter trough 662. A swivel truck 54S supports each column 100S on rail 36 for track SST. A horizontal wheel 274 on top of each column 100S is engaged between depending legs of top rail 284 of track SST. Traction motors TM are connected to drive wheels 86 in trucks 54S and controlled by automatic car controls in control circuit between the train and the carrier (local car) as taught in my U.S. Pat. Nos. 3,037,461 and 3,037,462 or 3,038,066.

The top beam 220S of frame 612S has a step 674 with two pin 222 on each level to engage in eyes 152S on containers 20S, the higher level being at the front. The step in beam 220S (a few inches full scale) suspends the container at the rear the step lower than a container on the front. The lower beam 616 is for engaging the bottom of the side of the container to support the container substantially level.

Each transfer displacement TD, FIGS. 124 and 125 guides a carrier coupled to a car up against the car wherealong a terraced transfer dip 32S, solid line in FIG. 126, sets a container down on the car and lifts the carrier about half of the dip back up to a height to engage and lift only the container which was on the car in the forward berth at which height the track curves out from the car with the container except on the run to the last station. The transfer run to the last station at the reversing end of a line has the dip 32 down and back to the same elevation before the curve out to remove both containers to carry them around a curve 676 at end of the line to the other side of cars 24S for the return run. The transfer displacement bypasses SB have switches in the lower and upper rails (see FIG. 109), the controls for these and the conveyors on the car being as in FIGS. 17 and 54 of my U.S. Pat. No. 3,956,994 to open the transfer displacement and dip run only after checking for safe conditions, that the containers are in proper location on the carrier and car and doors are latched closed for transfer.

The transfer dip TD in track SST, starting where the carrier with a container suspended on the rear has moved the container over the rear berth in the car, sets the container down on conveyor 370S on the car, clearing the hooks 222 on the rear step of beam 220S below eyes 152S and recessing the eyes on the forward container on the car as shown in FIG. 130 until all hooks 222 are below eyes 152S, FIG. 131. The eyes on forward container bob back up when hooks 222 clear below them. The slope to the terrace in the dip then lifts the carrier about half-way back up as it moves forward. This engages the hook pins 222 supported on the high forward step of beam 220S into eyes on forward container, FIG. 131, but leaves hooks on the lower step of beam 220S below the eyes on the rear container when the carrier is guided away from car 24S to leave the rear container set down on the car and remove the forward container.

Belt conveyor 370S on the container side thereafter is operated to carry the container at the rear to forward position using controls as in FIG. 54 of my U.S. Pat. No. 3,956,994. Doors at the forward spot are then opened with doors of the container thereat by opener as in FIGS. 50–53 of that patent, so the passengers received can take seats on the train and others can reload the container for the next transfer off.

The carrier is uncoupled from car 24S and slowed to stop with its container over an elevator 680. This is done with my automatic control circuits from my earlier patents mentioned. Elevator 68C is controlled to lift the container up into station house 682 at street level, FIGS. 132 and 133. The carrier is indexed forward so eyes on the container align above lower hooks on the rear half of the carrier while passengers leave and others enter the container for the next train. The container is set on rear hooks 222 when lowered ready for transfer to a car 24S in the next train, repeating the process. Where the platform PS is at subway level, FIG 134, elevator 680' lifts the container to unhook from the front of the carrier, the carrier indexed forward and the elevator lowered to set the container on the rear spot to align for transfer to the emptied rear berth on a car 24S in the next train.

Transfer cars 24S receive containers on either side, one side for the direction out and on the other side on the return run after reversing. All containers on cars 24S are removed approaching the reversing station and not set in until after the carriers which have run around curve 676 at the end of the run each side couples a car 24S for the run therewith and reach the first transfer dip back about half-way to first station on return run, along which the forward container set in the car is removed by this terraced dip but the rear container left so the car and carrier each have one container again.

Having thus described some of the various forms of this invention as applied to railways it is understood that the container can be a vehicle or load set on or picked up from a roadway, track, or channel as long as it is guided sufficiently accurately to be engaged and moved with the carrier on its cam track along the transfer run. This invention is covered as a toy or model as well as in utility sizes. It should be understood that I do not wish to be limited only to the embodiments shown and described herein but to all variations within the true spirit and scope of this invention, which the following claims are intended to embrace.

I claim as my invention:

1. A moving-vehicle bottom-support-way side transfer system comprising a first vehicle way, a first vehicle thereon, a second vehicle way, a second vehicle for transfer between said first vehicle and said second way, (said second vehicle way having means to bear) wheel means for supporting said second vehicle to run on said second way, said wheel means bearing the full weight of the second vehicle below that vehicle, a berth or spot on said first vehicle for said second vehicle to be carried on, first (side-extensible latching) side coupling means on said first vehicle (to engage and couple) for moving said second vehicle in lengthwise alignment with said berth for transfer, said second way incuding a transfer run along said first vehicle way which includes a coupling run wherealong the ways are spaced a distance apart so said coupling means can reach (when extended) for (to move) moving said second vehicle for transfer and an alignment run wherealong said second way is closer said first way enough to positioning said second vehicle aligned for transfer over said first vehicle, at least one lateral displacement S-curve in said second way connecting said coupling and alignment runs, and a dip in said second way along said alignment run at the opposite end thereof to lower said second vehicle to said berth on said first vehicle while aligned therewith or for lifting said second vehicle up from the first vehicle according to the direction of movement of said first vehicle along its way to load or unload said first vehicle of said second vehicle.

2. A system as in claim 1, said second way having plural successively-spaced S-curves connecting said coupling and alignment runs and means on said wheel means for separately following said S-curves to displace the second vehicle parallel to and from said first vehicle during transfer.

3. A system as in claim 1 said wheel means being a carrier for said second vehicle on said second way, said carrier having second coupling means for engaging the said coupling means on said first vehicle, and supporting means for supporting said second vehicle on said carrier for release therefrom when set down, and a second horizontal S-curve in said second way at lower end of said dip for removal of said carrier from said first way.

4. A system as in claim 3, said second coupling means being at least one fork prong extending transversely from the side of said carrier beyond said second vehicle when on said carrier.

5. A system as in claim 4, said second vehicle being a passenger type container, said coupling fork being above said container on said carrier.

6. A system as in claim 3, said second coupling means being two shock absorbers hinged together at rod ends extending from said carrier a beyond side of said second vehicle when on said carrier for coupling an extended said first coupling means, each shock absorber cylinder being pivotally connected at head end to the carrier at points separated along the length of the carrier to collapse in and extend to remain coupled to said first coupling means while extended from said first vehicle all along the transfer run.

7. A system as in claim 1, said second way being a bicycle track.

8. A system as in claim 1, said second way laping onto said first way at substantially the same elevation and an offset run parallel said first way in said second way between said coupling and alignment runs, and a second dip along said offset run, offset supporting means on at least one said vehicle to clear said second vehicle to be lowered from said first vehicle along the offset run so said ways can be on substantially the same level where they separate said second vehicle from said first vehicle.

9. A system as in claim 3, said support means being hooking means on said carrier and on said second vehicle along their sides for hooking the second vehicle onto the side of the carrier for transfer from said first vehicle.

10. A system as in claim 3, said support means being forks extending from said carrier for reaching under said second vehicle to lift it from said first vehicle.

11. A system as in claim 3, said carrier being rectangular in plan and having means for supporting the second vehicle off to one side, said second way being a horizontally gaged railway track said carrier having swivel trucks on said track, one supporting each corner of said carrier.

12. A system as in claim 3, said first and second way each being a railway track, said first vehicle being a railway car, a rail of said second way curving in crossing at grade a rail of said first way on said S-curves, an offset run in said second way parallel said first way having an incline up to a third S-curve to the alignment run a short displacement therefrom relative to the gage of the tracks, said carrier having frame having a side sill having a plurality of forks for supporting one or more said second vehicles and a leg at each end of the sill extending to same side as the forks to reach under said car and a swivel truck supporting each end of the frame on the end of a said leg, offset pedestal supporting means both on said car and on said second vehicle whereby said second vehicle when lifted by said forks from said car is moved to offset to clear for lowering down disengaged from the car so the carrier can cross the near rail of the railway at grade for transfer, said coupler means on the car side coupling with said forks.

13. A system as in claim 1 for handling a plurality of said second vehicles on each said first vehicle.

14. A system as in claim 3, said second way having a dip down and return to about half of the dip along said transfer run before the curve away, said first vehicle and said carrier each having supports for at least two said second vehicles, the supports on the carrier being on two different levels to set one second vehicle on and lift one off the first vehicle according to the location of the transfer vehicles on said first vehicle and carrier, and means for repositioning said second vehicle on said first vehicle for transfer off, and means for repositioning said second vehicle onto the higher said level on said carrier to the position for transfer to said first vehicle.

15. A system as in claim 3, said first vehicle being a truck bed said second vehicle being a container, jacking pedestals on said truck bed for lifting said container, forks on said carrier for reaching under said container when lifted on said pedestals, and means for jacking said pedestals simultaneously.

16. In a system as in claim 1 said second way being a track having rail and switches and at least one said displacement curve for carrying each end of the second vehicle parallel sidewise on separate rails into vertical alignment for transfer, said dip being a slope in said rail along this alignment to lower or lift the second vehicle for transfer of a load to or from said first vehicle.

17. A cam track as in claim 16, said switches being static and connecting corresponding ends of said curves by adjacent lapping of the rails forming the switch for plural grooved wheels to separate from single grooved wheels on said wheel means.

* * * * *